US012540499B2

(12) United States Patent
Schmitz

(10) Patent No.: US 12,540,499 B2
(45) Date of Patent: Feb. 3, 2026

(54) HINGE ASSEMBLY WITH COMMON ACTUATION

(71) Applicant: EMKA BESCHLAGTEILE GMBH & CO. KG, Velbert (DE)

(72) Inventor: Markus Schmitz, Bochum (DE)

(73) Assignee: EMKA BESCHLAGTEILE GMBH & CO. KG, Velbert (DE)

( * ) Notice: Subject to any disclaimer, the term of this patent is extended or adjusted under 35 U.S.C. 154(b) by 239 days.

(21) Appl. No.: 17/923,004

(22) PCT Filed: May 3, 2021

(86) PCT No.: PCT/EP2021/061579
§ 371 (c)(1),
(2) Date: Nov. 3, 2022

(87) PCT Pub. No.: WO2021/224187
PCT Pub. Date: Nov. 11, 2021

(65) Prior Publication Data
US 2023/0175297 A1 Jun. 8, 2023

(30) Foreign Application Priority Data
May 5, 2020 (DE) ..................... 10 2020 112 147.4

(51) Int. Cl.
*E05B 63/00* (2006.01)
*E05C 9/02* (2006.01)
*E05D 15/50* (2006.01)

(52) U.S. Cl.
CPC ............ *E05D 15/505* (2013.01); *E05C 9/021* (2013.01); *E05Y 2201/22* (2013.01); *E05Y 2900/132* (2013.01)

(58) Field of Classification Search
CPC ...... Y10S 292/11; Y10S 292/17; E05D 15/50; E05D 15/505; E05D 7/10; E05C 9/02; E05C 9/021
See application file for complete search history.

(56) References Cited

U.S. PATENT DOCUMENTS 505,480 A * 9/1893 Pletcher ................ E05D 15/505 217/57
1,280,629 A * 10/1918 Appleby ............... E05D 11/087 16/337
(Continued)

FOREIGN PATENT DOCUMENTS

DE 3111595 A1 10/1982
DE 10290395 B4 12/2009
(Continued)

OTHER PUBLICATIONS

European Patent Office (ISA/EP), International Search Report (with partial English translation), International Application No. PCT/EP2021/061579, 6 pages, Aug. 2, 2021.
(Continued)

*Primary Examiner* — Carlos Lugo
(74) *Attorney, Agent, or Firm* — Thompson Hine LLP

(57) ABSTRACT

A hinge assembly having at least two hinge locks for locking a door leaf relative to a door frame and for tilting the door leaf relative to the door frame, wherein an actuation device for common actuation of the hinge locks is provided. The disclosure also relates to a door comprising a hinge assembly and to a method for mounting a hinge assembly.

14 Claims, 16 Drawing Sheets

(56) References Cited

U.S. PATENT DOCUMENTS 1,323,756 A * 12/1919 Gogay ..................... E06B 1/52 49/382
2,790,992 A * 5/1957 Campbell ............ E05D 15/507 292/34
3,654,663 A * 4/1972 Algotsson ............... H01H 9/04 16/230
3,774,345 A * 11/1973 Cole .................... E05D 5/0223 49/504
3,889,419 A 6/1975 Maleck
4,223,494 A * 9/1980 Wendt ...................... E06B 1/32 49/504
4,532,673 A * 8/1985 Kim ..................... E05D 15/524 16/233
5,193,308 A * 3/1993 Davidian ................. E05D 7/12 16/382
5,595,408 A * 1/1997 Jeche ....................... E05C 9/06 292/37
5,711,121 A * 1/1998 Garver ................. E04H 1/1266 52/239
5,722,121 A * 3/1998 Lau ........................ E05D 5/128 16/389
5,829,197 A * 11/1998 Oh ....................... E05D 15/505 16/231
7,178,292 B2 * 2/2007 Yamada ............... E05D 15/502 16/229
7,761,958 B2 * 7/2010 Alfredsson .......... E05D 7/1066 16/261
8,850,762 B2 * 10/2014 Knauf ...................... E06B 1/52 52/212
10,280,665 B2 5/2019 Rieboldt et al.
10,498,114 B1 * 12/2019 Campos ................... E05C 9/24
10,590,687 B1 * 3/2020 Cifers ....................... E05D 7/12
2003/0020379 A1 * 1/2003 Larsen ................. E05D 15/502 312/218
2018/0258675 A1 9/2018 Rieboldt et al.
2021/0140212 A1 5/2021 Rieboldt
2022/0136299 A1 5/2022 Kaganov et al.

FOREIGN PATENT DOCUMENTS

| | | | | | |
|---|---|---|---|---|---|
| DE | 202011103492 | U1 | * | 12/2012 | ............ E05D 15/50 |
| DE | 102012103140 | A1 | * | 6/2013 | .............. E05D 5/04 |
| DE | 102015117505 | B3 | | 2/2017 | |
| DE | 102017129427 | B3 | | 11/2018 | |
| EP | 274549 | A | * | 7/1988 | .............. E05D 7/10 |
| EP | 0470601 | A1 | | 2/1992 | |
| EP | 0891027 | A1 | * | 1/1999 | |
| EP | 3702566 | A1 | | 9/2020 | |
| FR | 2936550 | A3 | | 4/2010 | |
| GB | 2490663 | A | * | 11/2012 | ............ E05D 11/00 |
| WO | 85/02647 | A1 | | 6/1985 | |
| WO | WO-9325790 | A1 | * | 12/1993 | ............ E05D 5/065 |

OTHER PUBLICATIONS

International Preliminary Report on Patentability issued Nov. 17, 2022 pertaining to International Application No. PCT/EP2021/061579, 9 pages.

* cited by examiner

HINGE ASSEMBLY WITH COMMON ACTUATION

This application is a national stage filing of International (PCT) Application No. PCT/EP2021/061579, corresponding to International Publication No. WO 2021/224187 filed on May 3, 2021, which in turn claims priority to German Application No. 10 2020 112 147.4 filed on May 5, 2020. The entire contents of both of those applications are hereby incorporated by reference.

The present disclosure relates to a hinge assembly having at least two hinged closures, for locking a door leaf with respect to a door frame and for pivoting the door leaf with respect to the door frame. Other subjects constitute a door having a hinge assembly, and a method for mounting a hinge assembly.

BACKGROUND

Hinged closures can very generally be understood to mean such hinges that can be used not only as a hinge but also as a closure, with the result that said hinge is provided with a dual function in this respect. If a corresponding hinged closure is used for example on a door, the door leaf can be pivoted about the hinged closure and opened as a result, but similarly the hinged closure can also be used to lock the door leaf with respect to the door frame. The range of use of such hinged closures therefore extends over quite different areas of technology. They can be used for example not only on doors, but also on windows, flaps, covers, hatches or other pivotable closing elements.

On account of the dual function of the hinged closure, it is often the case that multiple hinged closures are arranged on a door. Generally, they are arranged on the same side of the door but in oppositely situated end regions of the door. In this instance, end region is understood to mean that region close to the door edges at the periphery of the door in which hinges or closures are usually arranged. In that case, one hinge assembly having multiple hinged closures is accordingly provided per end region.

If all hinged closures are in the locking position, the door leaf is secured with respect to the door frame and is therefore not movable. In order to open the door, the latches of the hinged closures of one hinge assembly can be transferred individually from a locking position into an unlocking position and the door leaf can then be pivoted about the corresponding pivot axis of the locked hinged closure of the other assembly, that is to say that one which is arranged in the oppositely situated end region. The locked hinged closures then act as hinges.

Depending on which hinged closures of the two assemblies are locked and unlocked, the door leaf can thus correspondingly be opened once to the left and once to the right. In theory, it is also possible to arrange the hinged closures at the top and bottom, or even in all four end regions, of the door leaf. In that case, the door leaf could for example selectively also be pivoted upward or downward. Furthermore, it is also possible to switch all hinged closures of the door into the unlocking position. The door leaf is then no longer only pivoted with respect to the door frame, but can be removed from it. A corresponding hinged closure is described for example in DE 10 2015 117 505 B3.

Since a multiplicity of corresponding hinged closures are generally arranged on a door leaf, it is then necessary, in order to open the door, to transfer each individual hinged closure of a hinge assembly from the locking position into the unlocking position. Specifically in the case of tall doors, as are used for example in large server or switching cabinets and which often have three, four or more hinged closures per assembly, the actuation of all corresponding hinged closures one after the other is comparatively time-consuming.

SUMMARY

Taking this as a starting point, the current disclosure is based on the concept of a hinge assembly having hinged closures which can be locked and unlocked more quickly.

This may be achieved in the case of a hinge assembly of the type mentioned in the introduction by an actuating device for jointly actuating the hinged closures.

The actuating device makes it possible to jointly lock and unlock the at least two hinged closures, in particular all hinged closures, of the hinge assembly. It is therefore not necessary to individually lock or unlock each one of the hinged closures, this involving considerable simplification and saving of time. It is advantageous when each hinge assembly can be actuated only by way of a single device, which can then be used centrally to jointly actuate all hinged closures of the hinge assembly. This does not rule out that it is also possible to individually actuate some hinged closures of the hinge assembly, in particular additionally.

A hinge assembly is understood in one case to mean coherent elements which can be premounted together and then used as an assembly.

In one development, it may be advantageous when the hinge assembly has a hinge bar, which can be arranged on the door leaf and has multiple mounting points for mounting a respective hinged closure. Depending on the number of points at which the door leaf is to be connected to the door frame, a corresponding number of mounting points can be arranged on the hinge bar. In the case of smaller doors, for example, even two mounting points and consequently also two hinged closures per end region of the door can be enough. In the case of taller or heavier doors, which accordingly also must be connected to the door frame at multiple points, it is also possible to use four mounting points and consequently correspondingly four hinged closures per hinge assembly. The hinged closures may be spaced apart from one another by the same distance, resulting in a reliable connection of the door leaf to the door frame. Furthermore, it is also possible for the hinge bar to have more mounting points than will ultimately be used for the hinged closures. For example, it is conceivable for the hinge bar to have four mounting points, but for a hinged closure to be mounted only at two of these mounting points.

In terms of the configuration of the hinged closure, it may be advantageous when it has a first and a second hinge element, which can be pivoted with respect to one another about a pivot axis in order to move the door leaf. To that end, the first hinge element may be arranged on the door leaf or on the hinge bar that can be arranged on the door leaf, and the second hinge element may be arranged on the door frame. The pivotability of the two hinge elements then accordingly also makes it possible to pivot the door leaf with respect to the door frame.

In terms of the arrangement of the hinge bar on the door leaf, it may be advantageous when the hinge bar extends parallel to the pivot axis. The first and second hinge elements of the multiple hinged closures of a hinge assembly may all be pivotable about the same pivot axis, with the result that a single pivot axis is consequently assigned to the hinge assembly. The door leaf generally has a rectangular shape, and the pivot axis can extend parallel to the longer edge of the door leaf. Accordingly, it is also possible for the hinge bar to be arranged parallel to the longer edge of the door.

Furthermore, in terms of the pivot axis, it is proposed that it is located outside of the hinge bar. This configuration offers structural advantages, since the door leaf can then be opened and closed more easily and collision of the elements can be prevented.

In terms of the mounting, may be advantageous when the hinge bar and the hinged closures are in the form of a premounted mounting unit. This offers advantages in terms of the mounting. This is because, before the hinge bar is arranged on a door leaf, the hinged closures can be connected to the hinge bar and then arranged on the door leaf in the form of a mounting unit in one step. This enables simple and quick mounting, since the two mounting steps, that is to say the mounting of the hinged closures on the hinge bar and the hinge bar on the door leaf, are separate from one another. In particular when a hinge bar has many hinged closures and/or when multiple hinge bars are arranged on a door leaf, this premounting leads to considerable time being saved.

It has furthermore may be advantageous when the hinge bar can be arranged selectively either on the door leaf inner side or on the door leaf outer side. This variability makes it possible to connect door leaves and door frames of different types and with different geometric requirements to the hinge bar. The various advantages resulting from the external or internal mounting will be explained in more detail below. For the purpose of conversion, for example from an internal mounting to an external mounting, only very few amendments need to be made to the hinge bar and to the hinged closures.

In terms of the configuration of the hinge bar, it may be advantageous when it comprises a basic element for arrangement on the door leaf, and two limb elements. Consequently, the hinge bar may have a substantially U-shaped cross section, and the two limb elements may be arranged parallel to one another and perpendicularly to the basic element. Furthermore, however, it is also possible for just the first limb element to form a right angle with the basic element and for the second limb element to form a smaller angle, for example in the range of 30 to 70 degrees, with the base element. This bending of the second limb element makes it possible for the elements arranged in the hinge bar to be fixed in the hinge bar, in particular additionally. The smaller angle also requires less installation space. It is advantageous when the first limb element is closer to the pivot axis of the hinge assembly than the second limb element. Therefore, the first limb element can be assigned to the edge of the door leaf and the second limb element can face the middle of the door leaf.

In terms of the configuration of the hinged closures, it may be advantageous when the second hinge element and the first hinge element can be locked with respect to one another via a latch which can be moved back and forth in a latching direction between an unlocking position and a locking position.

In terms of the mounting, it may be advantageous when the first hinge element is connected to the hinge bar. The second hinge element may be arranged on the door frame, with the result that then, after the hinge bar has been arranged on the door leaf, the door can be pivoted correspondingly with respect to the door frame.

In one development, it is proposed that the hinge bar has in particular premounted mounting bolts, in particular welding bolts, for mounting the first hinge elements. The hinged closures and/or the first hinge elements can be connected securely to the hinge bar via the mounting bolts. The mounting bolts can be connected fixedly to the hinge bar and may be in the form of welding bolts. The mounting bolts may have a thread, with the result that the first hinge element can then be connected to the hinge bar via a nut. The respective mounting bolts may be part of the mounting points on the hinge bar, with the result that at least one mounting bolt is available at each mounting point. It is advantageous when each mounting point has two mounting bolts. This ensures a reliable connection between the first hinge elements and the hinge bar.

Furthermore, it may be advantageous when the hinge bar has multiple mounting recesses for the purpose of mounting the hinged closures. The mounting recesses may be part of the mounting points and one mounting recess may be assigned to each mounting point. The mounting recesses may extend through the first limb element and the basic element. The mounting recesses may be adapted to the hinged closures, in particular to the first hinge element, in particular to the hinge base, with the result that the hinge base can be placed into the hinge bar, or into the corresponding mounting recess, in a predefined position during the mounting. This facilitates the mounting or the connection of the hinged closures on or to the hinge bar. When the hinge base is connected to the hinge bar, the pivot pin receptacle of the hinge base may protrude beyond the bar. This therefore makes it possible to arrange the pivot axis not in the hinge bar itself, but spaced apart from it. In terms of the pivot axis, it also may be advantageous when it is spaced apart from the outer side of the door leaf and is arranged on that side of the door leaf situated opposite the door frame.

It also may be advantageous when the mounting bolts extend through the hinge bar for the purpose of connecting the hinge base to the latch holder. In this way, it is possible not just to connect the hinge base to the hinge bar, but at the same time also to connect the latch holder to the hinge base via the same mounting bolts. In this respect, the mounting bolts may extend perpendicularly to the basic element of the hinge bar. Therefore, the respective latch holders may also be connected to the respective hinge base at the respective mounting points, in each case via two mounting bolts in one scenario.

In order to lock or unlock the latches of the hinged closures, it may be advantageous when the latches of the respective hinged closures can be moved back and forth jointly between an unlocking position and a locking position via the actuating device. In this way, all latches of a hinge assembly can be moved at the same time from the unlocking position to the locking position or from the locking position to the unlocking position by a single actuation. The door can therefore be locked and unlocked very quickly.

For the purpose of corresponding actuation, it may be advantageous when the actuating device has at least one drive rod for moving at least one latch and a drive device for moving the drive rod. The latches can move parallel to the basic element of the hinge bar in the event of a corresponding movement in the latching direction. In the process, the drive rod can move parallel to the pivot axis, or the longitudinal axis, of the hinge bar and perpendicularly to the latching direction.

In one development, it is proposed that the latches of multiple, in particular two, hinged closures can be moved by means of one drive rod. This configuration makes it possible to ensure a reliable joint actuation of the latches. In the case of four hinged closures, and therefore also four latches, two drive rods can be provided. The corresponding drive device may be arranged between the two drive rods and then actuate them jointly. In this respect, it is possible for multiple drive rods to be movable by one drive device.

In terms of the configuration of the drive device, it may be advantageous when it has a rotatable actuating element, the rotational movement of which can be converted into a linear movement of an actuating rod. This configuration has the effect that the latches can be moved back and forth between the locking position and the unlocking position via for example a rotatable handle, a pawl, a pivot lever or else by actuation of a tool. The actuating element can be accessible from the outer side of the door leaf, with the result that all hinged closures of a hinge assembly can be locked and unlocked by hand.

The actuating rod may be in the form of a toothed rack and extend in a flat and parallel manner perpendicularly to the basic element of the hinge bar. The actuating element may be rotationally coupled to a pinion, and the pinion can mesh with the actuating rod for the purpose of linearly moving the actuating rod. For this purpose, the actuating rod may be in the form of a toothed rack having multiple teeth arranged next to one another or else having multiple recesses arranged next to one another, in which the teeth of the pinion can engage. As an alternative, a belt drive or a spindle drive is also possible for the purpose of converting the rotational movement into a linear movement.

To move the drive rods, it may be advantageous when, for the purpose of driving two drive rods, the actuating rod is connected to them on opposite sides. The actuating rod may consequently be connected to a respective drive rod at the top and the bottom end. It is advantageous when the actuating rod is connected detachably to the drive rods at the corresponding ends. In practice, it may be advantageous, for example, when the drive rod is hooked in the drive rod. For this purpose, at both ends, the actuating rod may have connecting portions formed in the manner of hooks and the drive rod may have connecting portions correspondingly in the form of recesses. It is also possible for drive rods to be connected not to the actuating rod, but to other drive rods connected to the actuating rod. In this respect, the drive rods may be arranged one behind another in succession and also for more than two drive rods to be moved via the actuating rod.

Furthermore, it may be advantageous when the drive device has a drive housing, which is connected to the hinge bar. Consequently, via the hinge housing, the drive device may be fastened in the hinge bar or connected to it. The hinge bar may have a mounting point for mounting the drive device. The mounting point may comprise mounting bolts, via which the drive housing can be connected to the hinge bar, in particular detachably. The mounting bolts for mounting the drive device may have a similar form to the mounting bolts for mounting the first hinge element. In this respect, the mounting bolts may extend through the drive device, or through the drive housing, and then be connected to the hinge bar, for example via nuts. The drive housing may then serve as a bearing for the pinion and for the actuating element. Upon actuation, it is consequently possible for the actuating element and the pinion rotationally coupled to the actuating element to be rotated with respect to the drive housing.

Furthermore, it may be advantageous when the drive housing is connected to a linear guide for guiding the movement of the actuating rod. The linear guide consequently makes it possible to ensure reliable movement of the actuating rod and it cannot become tilted or jammed during the actuation. Furthermore, by connecting the linear guide to the drive housing, it is also possible to couple the linear guide to the hinge bar, with the result that correspondingly it does not move conjointly with the actuating rod.

In terms of the drive device, it may be advantageous when it is in the form of a premounted mounting unit. The drive device may therefore be inserted into the hinge bar as a whole and then connected to it, thereby simplifying the mounting overall. When the drive device is being mounted in the hinge bar, the drive housing can be connected to the hinge bar via the mounting bolts and, in the process, the actuating rod can be connected correspondingly to the drive rods to be driven.

In one development of the drive device, it is also proposed that it has a blocking device, which prevents a movement of the actuating rod in a blocking position. When the blocking device is in the blocking position, the latches of the hinged closures can then no longer be moved and, for example when the hinged closures are in the locking position, the door can be secured against inadvertent opening. The blocking device may comprise a lock cylinder formed in the manner of a lock and have a rotatable blocking tongue. In the blocking position, the blocking tongue may engage in a recess of the actuating rod, with the result that the latter can then no longer be moved. By preventing the movement of the actuating rod, it is consequently also possible to prevent a rotational movement of the actuating element. The blocking device may be connected or connectable to the drive housing and be in the form of an additional module which can be used as an alternative. The blocking device may therefore, in the manner of a plug connection, be plugged into the drive housing and connected to it. The housing may have multiple receptacles for the blocking device and the blocking device may be connected to one of these receptacles, for example depending on the alignment of the hinge bar. It is also possible for the hinge device to be premounted as part of the drive device and then mounted together with the rest of the components in the hinge bar.

In terms of the configuration of the hinged closure, it may be advantageous when the second hinge element, in particular the connecting region of the second hinge element, extends through the hinge bar, in particular through the mounting recess for the respective hinged closure. Consequently, the second hinge element may also be premounted. In practice, however, it may be advantageous when the second hinge element is initially connected to the door frame, and the hinge bar, together with the rest of the parts of the hinged closures, is initially connected to the door leaf. The door leaf can then be connected to the door frame very easily. For this purpose, it is necessary only to bring the latches of the hinged closures into an unlocking position and to introduce the pivot pin of the respective second hinge elements correspondingly into the respective first hinge element. When the two hinge elements are correspondingly brought together, the latches can be brought into the locking position, with the result that the door leaf is then pivotably connected to the door frame. The mounting region of the second hinge element and the pivot pin of the second hinge element may then be situated on opposite sides of the hinge bar.

Furthermore, in particular in terms of the external mounting, it may be advantageous when the hinge bar is arranged in a hinge bar cover plate. In the event of external mounting, it is consequently possible to see only the hinge bar cover plate, and not the hinge bar. Since the hinge bar is not visible from the outside in any case in the event of internal mounting, a corresponding hinge bar cover plate is accordingly then not imperatively necessary. The hinge bar cover plate may cover the hinge bar all the way around. The hinge bar cover plate may have mounting recesses which may be formed correspondingly to the mounting recesses of the hinge bar, with the result that the hinge bar cover plate does not adversely affect the mounting of the hinged closures or make it more difficult. At the top and bottom ends, the hinge bar cover plate may be closed via end elements that can be plugged into the hinge bar cover plate. The hinge bar cover plate may also engage around the door leaf laterally from one side.

To connect the hinge bar cover plate to the hinge bar, the hinge bar may have mounting elements, in particular at the top and bottom ends. These mounting elements may have wing-like projections which can engage into or behind the hinge bar cover plate. The mounting elements may be in the form of pressure pieces and clamp the hinge bar cover plate against the hinge bar. The hinge bar cover plate may be connected to the hinge bar in a form fit via the mounting elements.

During the mounting, the mounting elements can be introduced into the hinge bar in a mounting position, and then, as a result of a rotation, in particular by 90 degrees, the projections of the mounting elements can engage into, or behind, the hinge bar cover plate and thus connect the hinge bar cover plate to the hinge bar. In order to remove the hinge bar cover plate, the mounting elements must then firstly be rotated back by 90 degrees again. The hinge bar cover plate can consequently be connected to the hinge bar detachably and without externally visible screws.

In terms of the concepts mentioned in the introduction, a door having a door leaf, a door frame, and a hinge assembly is proposed, wherein the hinge assembly is configured in the manner described above. The advantages already described in terms of the hinge assembly are afforded.

In terms of the door, it may be advantageous when the hinge bar is arranged on the outer side of the door leaf "Outer side" means that side of the door leaf that faces away from the door frame. In the event of this external mounting, the free door cross section may be larger than in the event of internal mounting, since only enough space for mounting the second hinge element, or for mounting the mounting region of the second hinge element, needs to be present on the door frame.

To connect the door leaf to the hinge bar or to the hinge assembly, it is possible to use mounting bolts, for example in the form of screws, in particular hexagon socket screws. They may pass through the door from the inner side of the door leaf and then be screwed into the hinge bar. In the process, the mounting bolts advantageously do not penetrate the hinge bar cover plate, with the result that they correspondingly cannot be seen on the outer side of the door leaf.

In an alternative configuration, it may be advantageous when the hinge bar is arranged on the inner side of the door leaf "Inner side" means that side of the door leaf that faces toward the door frame. In this configuration, the hinge bar cannot be seen from the outside, but for this the free cross section of the door frame is reduced, since not only is enough space for mounting the second hinged closure required on the inner side of the door leaf, but in addition there also needs to be space for the hinge bar between the door frame and the door leaf.

The door leaf may be in the form of a sheet-metal door leaf and have bent edges facing in the direction of the door frame in the peripheral regions. The hinge bar may bear against the bent edge, in particular in the event of internal mounting. In the event of external mounting, the hinge bar cover plate may cover the bent edge. The door frame may have a shoulder which projects in the direction of the free frame cross section and has a mounting surface arranged parallel to the door leaf. The second hinge element may be mounted on this mounting surface. The shoulder may also have a bent edge which faces in the direction of the door leaf and is provided with a seal, which is compressed by the door leaf in the closed position of the latter.

In terms of the door, it furthermore may be advantageous when the door leaf has mounting recesses. These mounting recesses may match the mounting recesses of the hinge bar, with the result that the mounting recesses are in line with one another and the hinge bar can be connected reliably to the door leaf. The door leaf may in addition also have recesses for the actuating device, with the result that the latter can be actuated from the outer side of the door leaf. In the event of external mounting, by contrast, a corresponding mounting recess of the door leaf for the actuating element of the drive device is not necessary. In this case, it is sufficient when the hinge bar and the hinge bar cover plate have corresponding recesses for the actuating element and optionally also for the blocking device.

Furthermore, a door having two hinge assemblies is proposed. In this case, the hinge assemblies may be arranged in oppositely situated end regions of the door leaf. The individual hinged closures of the two hinge assemblies may then be situated opposite one another in pairs.

Furthermore, in terms of the concepts mentioned in the introduction, a method for mounting a hinge assembly is proposed, wherein the hinge assembly is configured in the manner described above. It is proposed that firstly the hinge assembly is premounted and then the hinge assembly is mounted on the door leaf. During the mounting of the hinge assembly, it may be advantageous when firstly the hinge base is mounted in the hinge bar. After this, the drive rod can then be mounted. After this, the latch can then be mounted. After this, the latch holder can then be mounted. After this, the drive device, which in particular is already premounted, can then be mounted. After the hinge assembly has been mounted, it can then be arranged on the door leaf.

Whether the hinge assembly is to be connected to the inner side or to the outer side of the door leaf basically has no influence on the mounting sequence. In the event of external mounting, as a first step, the hinge bar can be pushed into the hinge bar cover plate. After the first hinge element has been connected to the hinge bar, the hinge bar cover plate can be connected to the hinge bar via the mounting element.

In particular the configuration of the hinged closure, the configuration of the drive rod, and the interaction of the components will be described in more detail below. If the following description contradicts the description above, the description above should take precedence.

The hinged closure is suitable for locking a door leaf with respect to a door frame and for pivoting the door leaf with respect to the door frame. Said hinged closure advantageously has a first hinge element for arrangement on the door leaf and a second hinge element for arrangement on the door frame, wherein the first hinge element and the second hinge element can be locked with respect to one another via a latch which can be moved back and forth in a latching direction between an unlocking position and a locking position. The latch may be movable back and forth between the unlocking position and the locking position via a drive rod which can be moved transversely to the latching direction.

Actuation via a drive rod which can be moved transversely to the latching direction makes it possible to reliably lock and unlock the latch from a position remote from the latch or the actual hinged closure. The longer the drive rod is here, the more remote the actuation point can be from the actual hinged closure, with the result that to some extent it is possible to locally decouple the actuation from the actual hinged closure. This local decoupling consequently also makes it possible to move the latches of hinged closures that can only be accessed with difficulty themselves.

In terms of the movement of the drive rod, it may be advantageous when it can be moved linearly back and forth perpendicularly to the latching direction of the latch. This configuration makes it possible to have the latch and the actual actuation point of the drive rod spaced apart to a great extent. In this respect, the drive rod may be movable parallel to the pivot axis of the door leaf. In particular if the hinged closure is arranged too high up and therefore cannot be reached by a person, the drive rod arranged parallel to the pivot axis makes it possible for the hinged closure to be actuated even by relatively small people. The drive rod may be coupled to the latch in the manner of a corner, or 90 degree, deflection means.

Furthermore, it may be advantageous when the drive rod is part of the actuating device.

In one development of the drive rod, it is proposed that it is in the form of a flat rod. A corresponding flat rod can extend parallel to the door leaf and therefore requires only little space. A flat rod may be successful also in terms of the transmission of the movement of the drive rod to the latch, this being explained in more detail below with regard to the further configuration of the drive rod. Furthermore, however, it is also possible for the drive rod to be in the form of a profiled or round rod.

In order that the latch can be moved via the drive rod, it may be advantageous when the drive rod has at least one guide slot, in which the latch, in particular a guide element of the latch, is guided. Via the guide slot, the movement of the drive rod can be converted into a movement of the latch oriented transversely or perpendicularly thereto. In structural terms, the guide slot may be in the form of an elongate hole, and the latch, or a guide element of the latch, may be received in the elongate hole of the drive rod. The latch may be designed in such a way that it can move only linearly in the latching direction, with the result that the movement of the drive rod makes it possible to move the latch back and forth reliably between the unlocking position and the locking position.

In terms of the movement of the latch by the drive rod, in one development it may be advantageous when the drive rod has two guide slots, which in particular are arranged parallel to one another. In this respect, a latch can then be guided in the two guide slots, thereby allowing reliable movement of the latch and reducing the risk of tilting of the latch and/or of the drive rod. When the drive rod serves to drive multiple latches, as was already described above, it may correspondingly have one, advantageously two parallel, guide slots for each latch to be driven.

It also may be advantageous when the guide slot is S-shaped. This configuration makes it possible to reliably move the latch with relatively small effort. The guide slot may have a starting region and an end region, which may be aligned parallel to one another. A straight or curved connecting region may be provided between the starting region and the end region, resulting in an S-shaped profile overall. In this context, S-shaped does not necessarily mean that the guide slot has to be curved, rather it may also exclusively have straight regions. The starting region and the end region of the guide slot may extend parallel to the pivot axis, with the result that, upon a movement of the drive rod, the latch, which can be moved only in the latching direction, does not move if the latch is guided in the starting region or in the end region. Only when the drive rod is moved in such a way that the latch is guided in the connecting region is a movement of the drive rod converted into a corresponding transverse movement of the latch.

An S-shaped guide slot makes it possible to reduce the initial actuation force necessary to move the latch. This is because, as a result of the transition between the starting region and the connecting region and between the end region and the connecting region, the latch can initially only move slightly upon a movement of the drive rod, and only in the middle part of the connecting region can the movement of the drive rod for example initiate the same degree of movement, aligned transversely thereto, of the latch. To move the latch, it is advantageous when the guide slot, or when the connecting region of the guide slot, forms an angle of 45° with the latching direction. When there are multiple guide slots, in particular two guide slots, they may be parallel to one another.

In terms of the configuration of the hinged closure, it furthermore may be advantageous when the first hinge element is formed in multiple parts and has a hinge base and a latch holder, wherein the latch is received movably between the hinge base and the latch holder. A corresponding multi-part configuration offers advantages in terms of mounting the elements, since they can be mounted one after another. The latch may be received linearly movably between the hinge base and the latch holder, with the result that, upon a movement in the latching direction between the locking position and the unlocking position, the latch can slide back and forth between the hinge base and the latch holder. In this respect, the hinge base and the latch holder may serve as a guide for the latch in the latching direction.

Furthermore, it may be advantageous when the latch is received captively between the hinge base and the latch holder. The hinge base and the latch holder may engage around the latch in the connected position in such a way that the latch cannot be removed, but rather is held securely between the two elements. As a result, the latch can still be moved reliably in the latching direction and cannot slip out of the hinge element even after relatively lengthy operation and optionally even after a certain degree of wear has been reached. In this respect, this then also ensures reliable operation of the hinged closure over a lengthy period of time. In order to remove the latch from the hinged closure, it is then necessary firstly to separate the latch holder and the hinge base from one another.

In order to ensure reliable movement of the latch, it may be advantageous when the latch is guided in the hinge base and/or in the latch holder. For the purpose of guidance, in particular on opposite sides, the latch may have at least one guide element in the form of a guide pin, which guide element can be guided in a corresponding guide of the latch holder or of the hinge base. Advantageously, one, in particular two, guide elements on one side of the latch are guided in the latch holder and one, in particular two, guide elements on an opposite side of the latch are guided in the hinge base. This dual guidance enables reliable movement of the latch. Two guide elements per side of the latch also make it possible to ensure that, upon a corresponding movement in the latching direction, the latch does not tilt and that, in this respect, reliable unlocking and locking can be ensured. The hinge base and/or the latch holder may have guides which are formed in the manner of elongate holes and in this respect enable a linear movement of the latch. The elongate holes of the respective elements may be arranged parallel to one another and the elongate holes of the hinge base and of the latch holder may be situated opposite one another and be in line with one another.

At least one guide element may extend through the slot of the drive rod and extend into the guide of the latch holder or into the guide of the hinge base. By virtue of this configuration, the drive rod is connected to the first hinge element in a form fit and a movement of the drive rod leads to the guide element of the latch being moved both in the guide slot and in the guides of the latch holder and/or of the hinge base.

In terms of the arrangement of the drive rod, it may be advantageous when it is arranged at least in certain portions between the latch and the hinge base. Upon a movement, the drive rod may consequently slide back and forth between the latch and the hinge base and in the process move the latch back and forth correspondingly in the latching direction. The drive rod may consequently be arranged at least in certain portions in the hinged closure. The hinge base and also the latch may have corresponding sliding surfaces, which facilitate the sliding of the drive rod back and forth. The configuration of the drive rod as a flat rod may be advantageous in particular in this context, since this configuration makes it possible for the hinged closure to have only a small structural volume and the space requirement for the drive rod between the latch and the hinge base is small. As an alternative, it is also possible for the drive rod to be arranged at least in certain portions between the latch and the latch holder. In this configuration, too, the drive rod can slide back and forth in the hinged closure and move the latch correspondingly in the latching direction.

Furthermore, it may be advantageous when the latch holder laterally engages around the latch. In this respect, the latch holder may have two guide surfaces, between which the latch is guided and which in this respect are used for lateral linear guidance of the latch. As a result of this configuration, not only is the latch still additionally guided, but the mounting is also simplified, since the latch holder is arranged with respect to the latch in a position fixedly defined by the guide surfaces. Subsequent alignment is therefore basically not necessary.

In one development of the latch, it is proposed that the latch has a latching portion and a movement portion. The latching portion may have a block-shaped form and therefore provide high stability, with the result that the latch can connect the two hinge elements to one another securely in the locking position. The movement portion may have a planar form and extend perpendicularly to the latching portion. The movement portion may be guided in the latch holder, and the guide elements may likewise be arranged on the latching portion. In this respect, the movement portion may serve to ensure a movement of the latch between the locking position and the unlocking position. The movement portion may be arranged parallel to the drive rod, resulting in a compact structure.

The latching portion may be guided in the hinge base. The hinge base may have guide surfaces which constitute a further guide for the latch and allow only a linear movement between the locking position and the unlocking position.

The latching portion may have at least one recess, through which the second hinge element, in particular a stiffening rib of the second hinge element, can extend in the locking position. The recesses may extend perpendicularly to the latching direction. It is advantageous when the latching portion has two, in particular parallel, recesses. A respective stiffening rib of the second hinge element can extend through these two recesses, with the result that the latch can laterally engage around the second hinge element, or the reinforcing ribs of the second hinge element, in the locking position. Furthermore, the reinforcing ribs may consequently likewise serve as a guide for the latch. Upon a movement from the unlocking position into the locking position, the recesses of the latch can be moved via the stiffening ribs of the second hinge element. Furthermore, the recess may subdivide the latching portion into two latching blocks. When there are two recesses, they may subdivide the latching portion correspondingly into three latching blocks.

In a further advantageous configuration, the hinge base may have a guide projection, which engages in the recess of the latch in the unlocking position. When two recesses are provided, it is correspondingly also possible to provide two guide projections, which can then engage in a respective recess of the latch. When the transfer from the locking position to the unlocking position takes place, the latch, or the latching blocks, are then moved back and forth between the guide projections of the hinge base and the stiffening ribs of the second hinge element.

In terms of the connection of the hinge base to the latch holder, it may be advantageous when the hinge base is connected detachably to the latch holder. This simplifies the mounting of the hinged closure, since firstly the latch can be placed into the hinge base and then the latch holder can be connected detachably to the hinge base. In the process, the latch can be received in a form fit, but linearly movably, between the hinge base and the latch holder.

Furthermore, it is advantageous when the hinge base and the latch holder can be connected to one another via at least one mounting bolt. Both the hinge base and the latch holder may have corresponding recesses or bores, through which the mounting bolt can pass. It is furthermore also possible for the mounting bolt to be fixedly connected to the latch holder or to the hinge base. In this configuration, only the other element then correspondingly has a recess or a bore for the mounting bolt. The mounting bolt may have a thread, with the result that the latch holder and the hinge base can then be connected to one another via a nut that can be screwed onto the mounting bolt. Furthermore, it is also possible for the mounting bolt to be part of the door leaf and for example be fixedly connected thereto. The mounting bolt may for example be welded to the door leaf and therefore be in the form of a welded-on bolt.

Furthermore, it may be advantageous when the latch holder and the hinge base are connected to one another via two mounting bolts. This configuration ensures reliable fixing of the two elements. Furthermore, it is possible for the hinge base also to be able to be connected to a door or a door leaf via the same mounting bolt(s). In this respect, the hinge base and the latch holder may then be connected to the door leaf jointly via one or optionally also more hinge pins. Furthermore, it is also possible to connect the elements not directly to a door, but to a hinge bar. The mounting bolts can then for example be part of the hinge bar and be fastened in or on it.

The more precise configuration of the hinge bar and the mounting of the elements on the hinge bar is described in more detail below.

In terms of the mounting bolt, it may be advantageous when it extends perpendicularly to the latching direction and correspondingly in the normal direction in relation to the door leaf. In an alternative configuration, however, the mounting bolt may also extend parallel to the latching direction. In this configuration, the latch holder may have a receiving bushing, for example with an internal thread, and the hinge base may for example have a bore for the mounting bolt. The mounting bolt may then be screwed into the receiving bushing and thus connect the latch holder to the hinge base. In this configuration, the hinge base may be connected to the door or to the hinge bar via other mounting bolts. For connection to the door or to the hinge bar, the hinge base may have a mounting portion which can extend parallel to the surface of the door or parallel to the hinge bar, respectively.

The latch holder and the hinge base may each have connecting projections, which in particular are planar, and the receptacles for receiving the mounting bolt(s) may be arranged in the connecting projections. The first hinge element may have a receiving groove, in which the drive rod can be guided. The receiving groove may be produced in that the two connecting projections project in different directions and lie one on top of the other. The receiving groove may be formed correspondingly by the hinge base and the latch holder. The receiving groove may extend perpendicularly to the latching direction and in the longitudinal direction of the hinge bar.

In terms of the configuration of the second hinge element, it may be advantageous when it is in the form of a hinge block that can be connected to the door frame.

The second hinge element may have a mounting region for mounting on a door frame. The mounting region may have one, in particular two, mounting bores and be screwed to the door frame via them. It is advantageous when the second hinge element is connected to a surface of the door frame that is aligned parallel to the door leaf in the closed position of the door. The second hinge element may have a pivot pin defining a pivot axis. In the locking position, the first hinge element and thus also the door leaf can be pivoted about the pivot axis of the second hinge element, which is connected to the door frame. The second hinge element may have a connecting region which connects the pivot pin to the mounting region. The connecting region may extend perpendicularly to the door leaf when the door is closed. The connecting region may have one, in particular two, stiffening ribs which ensure the second hinge element has enough stability that the weight of the door can be taken up by the corresponding connecting region even in the case of heavy doors. The pivot pin may protrude beyond the connecting region in particular laterally, resulting in a T-shaped contour of the second hinge element.

The second hinge element may also have a receiving region for receiving the latch in the locking position. The receiving region may be arranged between the pivot pin and the mounting region, and the latch can be moved into this receiving region in the locking position, in order thus to secure the pivot pin in the hinge base.

To correspondingly receive the pivot pin, the hinge base may have a pivot pin receptacle. The pivot pin receptacle may engage around the pivot pin of the second hinge element at least in certain portions and therefore ensure the door leaf is reliably supported on the door frame. The pivot pin receptacle, or the edges of the pivot pin receptacle, may also act as a stop and therefore delimit the opening angle of the door leaf with respect to the door frame. The pivot pin receptacle may be divided up and have two pivot pin receptacle regions. In each of the pivot pin receptacles, part of the pivot pin can be received. The second hinge element, or the connecting region of the second hinge element, may extend between the two pivot pin receptacle regions. When the door is closed, it is then possible for the connecting region of the second hinge element to lie between the two pivot pin receptacle regions.

In one development, it may be advantageous when the pivot pin is secured between the hinge base, in particular the pivot pin receptacle, and the latch, in particular in the latching portion, in the locking position. The latch and the pivot pin receptacle may engage around the pivot pin of the second hinge element in a form fit to the extent that no translational movement of the two hinge elements in relation to one another, but only a rotational movement of the two hinge elements in relation to one another, is possible. In this respect, the first hinge element and the second hinge element may then be pivotably connected to one another in the locking position. In this case, the first hinge element may be pivotable about the pivot axis, or about the pivot pin, of the second hinge element.

In the unlocking position, it is possible that the latch no longer secures the pivot pin of the second hinge element, with the result that the two hinge elements can be moved in translation with respect to one another in that case. In this position, the door leaf can be taken off from the door frame, for example, or the door or the door leaf can be pivoted about a different pivot axis.

Furthermore, it may be advantageous when an emergency unlocking means is provided, with which the latch can be transferred from the locking position to the unlocking position. The emergency unlocking means may be actuatable from both sides of the door and therefore ensure the door can be opened reliably in an emergency. A corresponding emergency unlocking means makes it possible to transfer the latch from the locking position to the unlocking position, but not back to the locking position.

The latch holder, the hinge base and the latch may be in the form of injection molded parts and consist of plastic. Furthermore, the elements may also consist of metal, in particular stainless steel or cast steel. The same applies for the drive rod, the actuating device and the second hinge element. The elements may also consist of different materials.

Furthermore, a door having a hinged closure is proposed, wherein the hinged closure is configured in the manner described above. The advantages already described in terms of the hinged closure are afforded.

It is advantageous when the second hinge element is arranged on the door frame and the first hinge element is arranged on the door leaf, with the result that the door leaf is connected to the door frame via the hinged closure. To connect the door leaf to the door frame, multiple hinged closures arranged in oppositely situated end regions of the door leaf may be advantageous. Depending on the height of the door leaf, it is possible to provide for example four, six, eight, or even more hinged closures. The hinged closures may be situated opposite one another in pairs and be arranged in end regions of the door leaf. In order to be able to connect the first hinge elements to the second hinge elements, the first hinge elements may protrude beyond the door leaf, in particular laterally. It is also possible for the door leaf to have mounting recesses, through which the second hinge element can extend as far as the first pivot pin receptacle, or the pivot pin receptacles, of the hinge base.

BRIEF DESCRIPTION OF THE DRAWINGS

Further details and advantages are to be explained in more detail below with the aid of the appended figures, in which.

DETAILED DESCRIPTION

Figure 1:
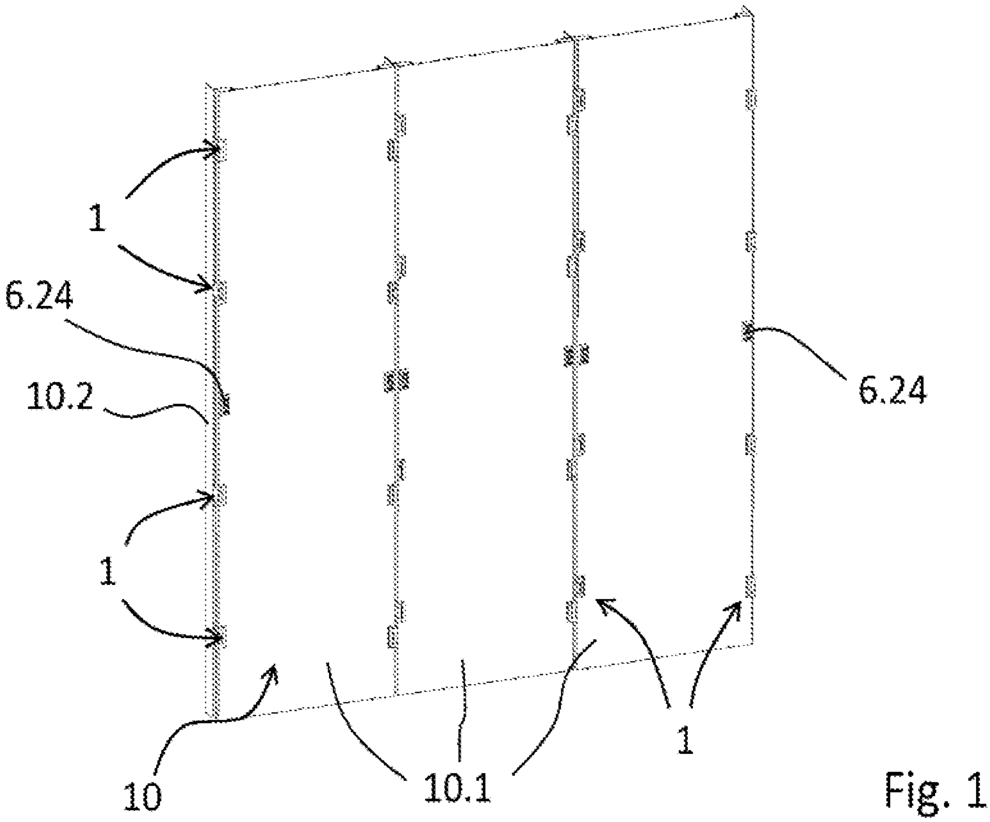
FIG. 1 shows multiple door leaves arranged next to one another, each of which is connected to the respective door frame via eight hinged closures.

Hinged closures 1 serve to lock a door leaf 10.1 with respect to a door frame 10.2 and to pivot the door leaf 10.1 with respect to the door frame 10.2, with the result that they have a dual function in this respect. A hinge assembly 11, which comprises multiple such hinged closures 11, consequently makes it possible to pivot and lock even the door leaves 10.1 of large doors 10 with respect to the door frame 10.2. Before the configuration of the hinge assembly 11 and its components are discussed in more detail below, firstly the underlying function of the hinged closures 1 arranged on a door leaf 10.1 are to be described in more detail.

The illustration of FIG. 1 depicts multiple doors 10 that are arranged closely next to one another, each having a door leaf 10.1 and a door frame 10.2. The door leaves 10.1 of the doors 10 are rectangular and in this respect are considerably taller than they are wide. Typically, such door arrangements are used for large servers or switching cabinets.

As can furthermore be seen in FIG. 1, each of the doors 10 shown has eight hinged closures 1 overall, with the result that each door leaf 10.1 can be pivoted and opened once to the left, that is to say about the respective four left-hand hinged closures 1, and similarly about the four right-hand hinged closures 1. In order to open the door leaf 10.1 to the left, it is then necessary to lock the left-hand hinged closures 1 and unlock the right-hand hinged closures 1. When the door leaf 10.1 is to be opened to the right, it is necessary to lock the right-hand hinged closures 1 and unlock the left-hand hinged closures 1. When all eight hinged closures 1 of a door 10 are locked, the door leaf 10.1 is held in place with respect to the door frame 10.2, and the door leaf 10.1 correspondingly cannot be moved. When all eight hinged closures 1 are unlocked, the door leaf 10.1 can be taken out of the door frame 10.2.

Figure 2:
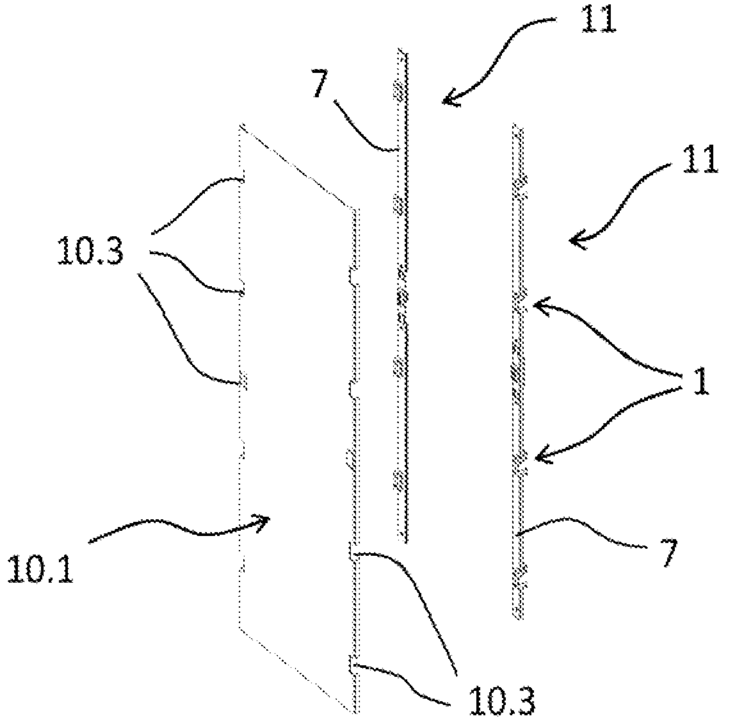
FIG. 2 shows a view of a detail of a door having two hinge assemblies arranged on the inner side of a door leaf.

As can be seen in the illustration of FIG. 2, the hinged closures 1 of an end region of the door leaf 10.1, that is to say the right-hand hinged closures 1 and the left-hand hinged closures 1, are each arranged in a hinge bar 7. The hinge bar 7, together with the respective hinged closures 1, forms a hinge assembly 11, with the result that each of the door leaves 10.1 illustrated in FIG. 1 is connected to the door frame 10.2 via two hinge assemblies 11.

Figure 5A:
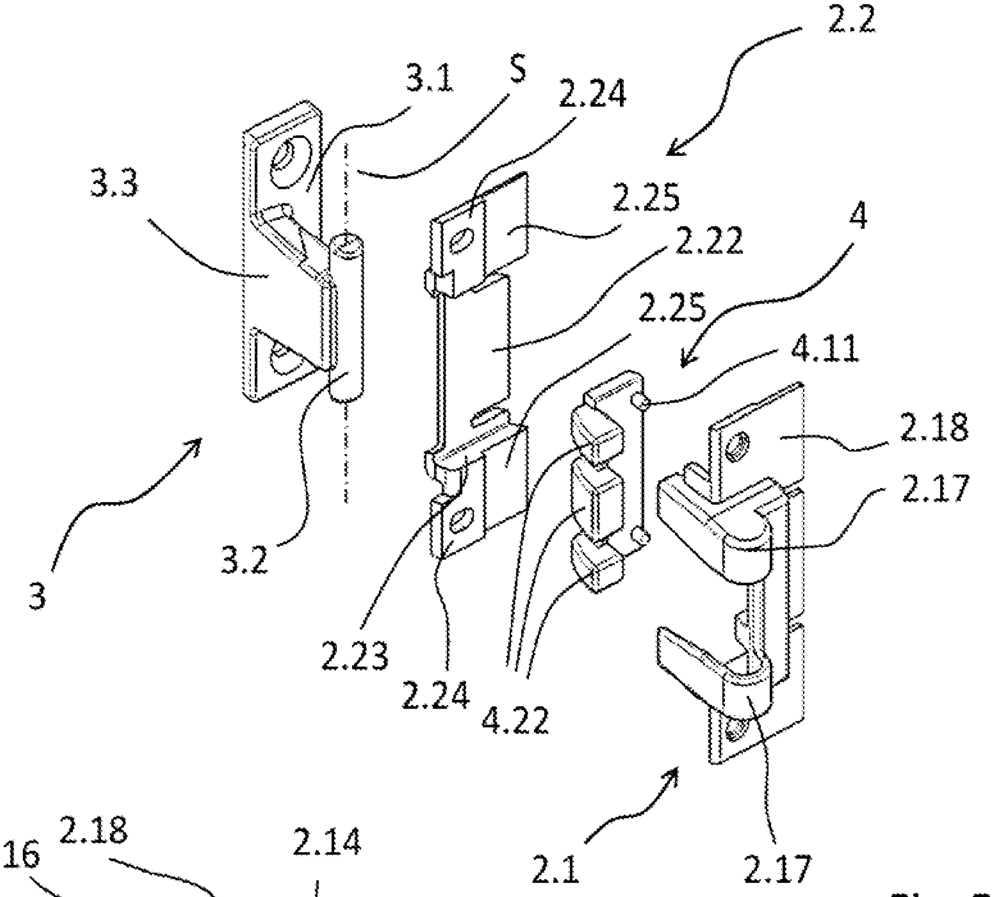
FIG. 5*a* shows an exploded view of the hinged closure.
Figure 5B:
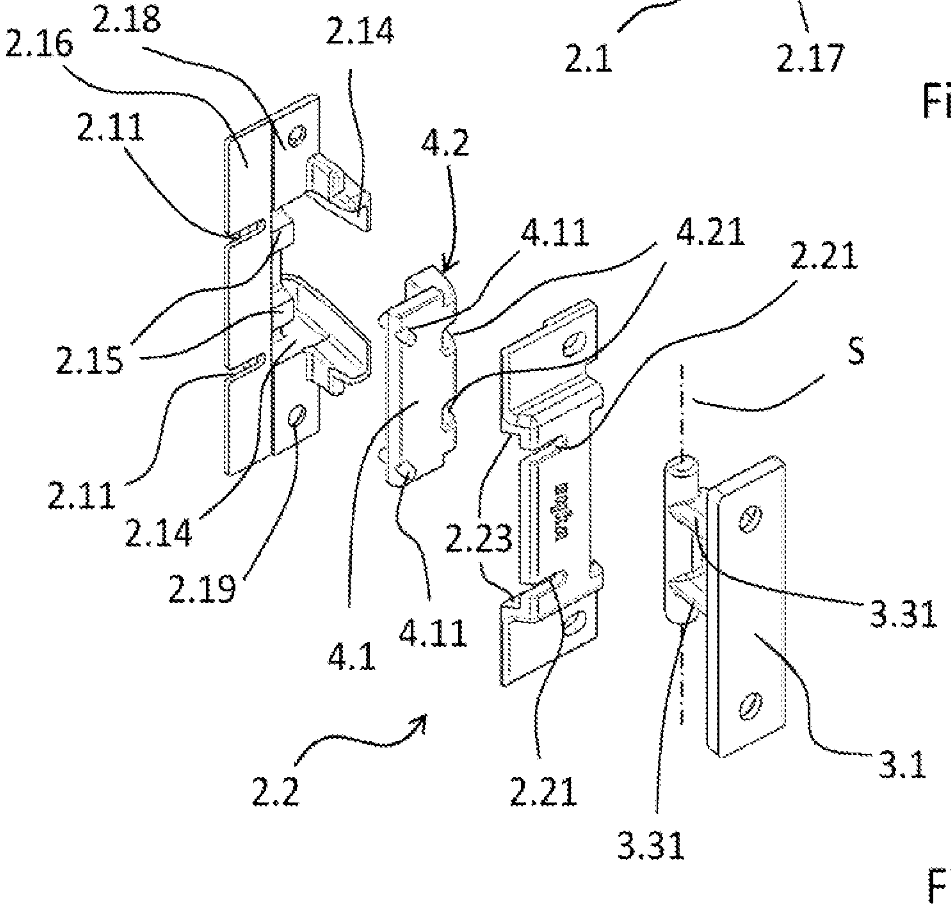
FIG. 5*b* shows an exploded view of the hinged closure

Before different configurations of and possible ways of mounting the hinge bars 7 or the hinge assemblies 11 are discussed in more detail below, now firstly the structure of the individual hinged closures 1 are to be described in more detail on the basis of FIGS. 5*a* and 5*b*. In the illustration of FIGS. 5*a* and 5*b*, a hinged closure 1 is shown in an exploded illustration. The hinged closures 1 that can be seen in FIGS. 1 and 2 correspond to those illustrated in FIGS. 5*a* and 5*b*.

The hinged closures 1 consist substantially of two parts, specifically a first hinge element 2 and a second hinge element 3. In the locking position V, the first hinge element 2 and the second hinge element 3 are pivotably connected to one another, with the result that the door leaf 10.1 can then be pivoted correspondingly about this hinged closure 1, or about the pivot axis S of the hinged closure 1. In terms of the hinge assembly 11 having multiple hinged closures 1, the hinge elements 2, 3 of each hinged closure 1 of a hinge assembly 11 are pivotable about the same pivot axis S, with the result that a pivot axis S can be assigned to each hinge assembly 11. Accordingly, all hinge elements 2, 3 of a hinge assembly 1 are pivotable relative to one another about the same pivot axis S. In the unlocking position E, the two hinge elements 2, 3 are then no longer pivotably coupled to one another, but are movable in translation relative to one another, with the result that the door leaf 10.1 then pivots correspondingly about another pivot axis S or the door leaf 10.1 can be taken out of the door frame 10.2, as was already described above.

The first hinge element 2 consists of three elements, specifically a hinge base 2.1, a latch 4 which can be moved back and forth in a latching direction R, and a latch holder 2.2. In this respect, the latch holder 2.2 and the hinge base 2.1 act as guides for the latch 4, and the latch 4 is received captively between these two elements, with the result that the latch 4 can only be removed when the hinge base 2.1 and the latch holder 2.2 are separated from one another. Both the hinge base 2.1 and the latch holder 2.2 have guides, which are denoted by 2.11 and 2.21, respectively, and in each of which a guide element 4.11 formed in the manner of a guide pin is guided. Upon a movement of the latch 4 in the latching direction R, the guide elements 4.11 then move in the corresponding guides 2.11, 2.21 and any other movement of the latch 4 is prevented. As can be seen in particular in FIG. 5*b*, the latch 4 has four guide pins overall, two of which are guided in the guide 2.11 of the hinge base 2.1 and two of which are guided in the guide 2.21 of the latch holder 2.2.

The latch holder 2.2 additionally also has a lateral guide for the latch 4, as can be seen in FIG. 5*a*. For this purpose, the latch sliding surface 2.22 is recessed, resulting in the production of a kind of receptacle having two lateral guide surfaces 2.23, which then laterally engage around and guide the latch 4.

As can also be seen, the latch 4 has a substantially L-shaped cross section, and it consists of a rather flat movement portion 4.1 and a latching portion 4.2 arranged perpendicularly thereto. The movement portion 4.1 is arranged between the hinge base 2.1 and the latch holder 2.2 and is moved back and forth between the locking position V and the unlocking position E by a drive rod 6.1, as will be described in more detail below on the basis of the further figures. The latching portion 4.2 has a block-shaped form and is therefore also considerably more stable than the movement portion 4.1. This is associated with the fact that, in the locking position V, the latching portion 4.2 ensures that the pivot pin 3.2 is received between the latching portion 4.2 and the hinge base 2.1, or the pivot pin receptacle 2.17 of the hinge base 2.1, and therefore is subject to comparatively high forces, this also being associated with the size, or the weight, of the door leaf 10.1.

Furthermore, the latching portion 4.2 has two recesses 4.21 which subdivide the latching portion 4.2 into three latching blocks 4.22. As can be seen on the basis of FIG. 5*b*, the hinge base 2.1 has two guide projections 2.15, which engage precisely in the recess 4.21 of the latching portion 4.2 and thus additionally serve to laterally guide the latching portion 4.2. Furthermore, the hinge base 2.1 also has additional lateral guide surfaces 2.14, which likewise laterally guide the latching portion 4.2.

The three-part division of the latching portion 4.2 is additionally also adapted to the configuration of the second hinge element 3, which is formed in the manner of a hinge block. As can be seen in FIG. 5*b*, the second hinge element 3 has a mounting region 3.1 with a planar surface, via which the second hinge element 3 can be connected to the door frame 10.2. The pivot pin 3.2, the longitudinal axis of which forms the pivot axis S of the hinged closure 1 and thus also the pivot axis of the door leaf 10.1 with respect to the door frame 10.2, is arranged spaced apart from this mounting region 3.1. The pivot pin 3.2 is connected to the mounting region 3.1 via a connecting region 3.3. The mounting region 3.1 has two stiffening ribs 3.31, which can be seen in FIG. 5*b* and are in line with the guide projections 2.15. In this respect, the three latching blocks 4.22 of the latch 4 engage around the two stiffening ribs 3.31 of the second hinge element 3 in the locking position V, and around the two guide projections 2.15 of the hinge base 2.1 in the unlocking position E. When moving between the locking position V and the unlocking position E, the latch 4, or the latching portion 4.2, consequently is moved either between the stiffening ribs 3.31, in order to secure the hinge pin 3.2 in the hinge pin receptacle 2.17, or between the guide projections 2.15, in order to release the hinge pin 3.2 in this unlocking position E.

Figure 6A:
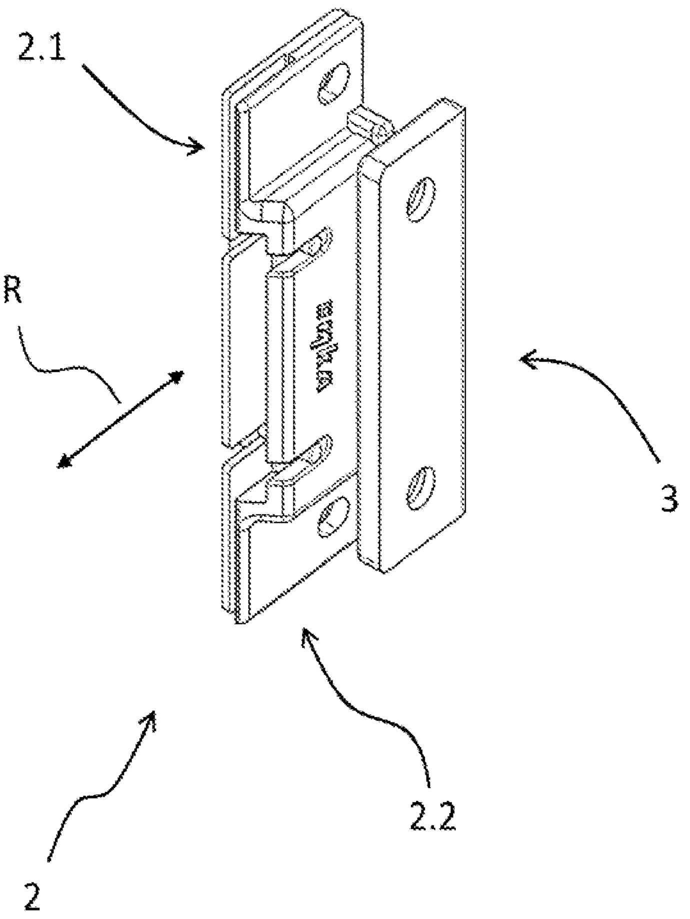
FIG. 6*a* shows a perspective view of the hinged closure according to FIGS. 5*a*, 5*b;*

To connect the hinge base 2.1 to the latch holder 2.2, the two elements have corresponding bores, with the result that the hinge base 2.1 can be connected to the latch holder 2.2 via a screw connection. The corresponding bores of the latch holder 2.2 are arranged on a connecting projection 2.24, and the bores of the hinge base 2.1 are arranged on a mounting portion 2.18, which likewise projects somewhat. A guide groove, which extends through the first hinge element 1 perpendicularly to the latching direction R and which also can be seen in FIG. 6*a*, is created behind the corresponding portions 2.18, 2.24 by these projections. In FIG. 6*a*, the latch 4 is not illustrated, but the intermediate space between the hinge base 2.1 and the latch holder 2.2, in which intermediate space the latch 4 is arranged, can be clearly seen. The corresponding surfaces of the intermediate space are each in the form of drive rod sliding surfaces and denoted by 2.16 and 2.25, respectively. The drive rod 6.1, which is also not illustrated in FIG. 6*a* and the functioning of which will be described in more detail below, is arranged in the groove-shaped intermediate space between the latch 4 and the hinge base 2.1 in the center region, or between the latch holder 2.2 and the hinge base 2.1 in the two outer regions.

The drive rod 6.1 is in the form of a flat rod and can be moved perpendicularly to the latching direction R and therefore in the longitudinal direction of the hinge bar 7. The drive rod 6.1 has four S-shaped guide slots 6.11 overall, each two of which are arranged in pairs and each two of which serve to drive a latch 4, with the result that two latches 4 can be moved back and forth by the drive rod 6.1. The guide elements 4.11 of the latch 4 that are guided in the guides 2.11, 2.21 of the latch base 2.1 are additionally also guided in the guide slots 6.11 of the drive rod 6.1. This is evident for example on the basis of FIG. 6*a*. The two guide elements 4.11 that face the hinge base 2.1 and are guided in the guides 2.11 specifically additionally penetrate the two guide slots

6.11 of the drive rod 6.1. In the process, each guide element 4.11 is guided in one of the guide slots 6.11. Upon a linear movement of the drive rod 6.1, the guide elements 4.11 then slide in the guide slots 6.11 and therefore move the latch 4 forward or back in the latching direction R, depending on the direction in which the drive rod 6.1 is moved.

Figure 4:
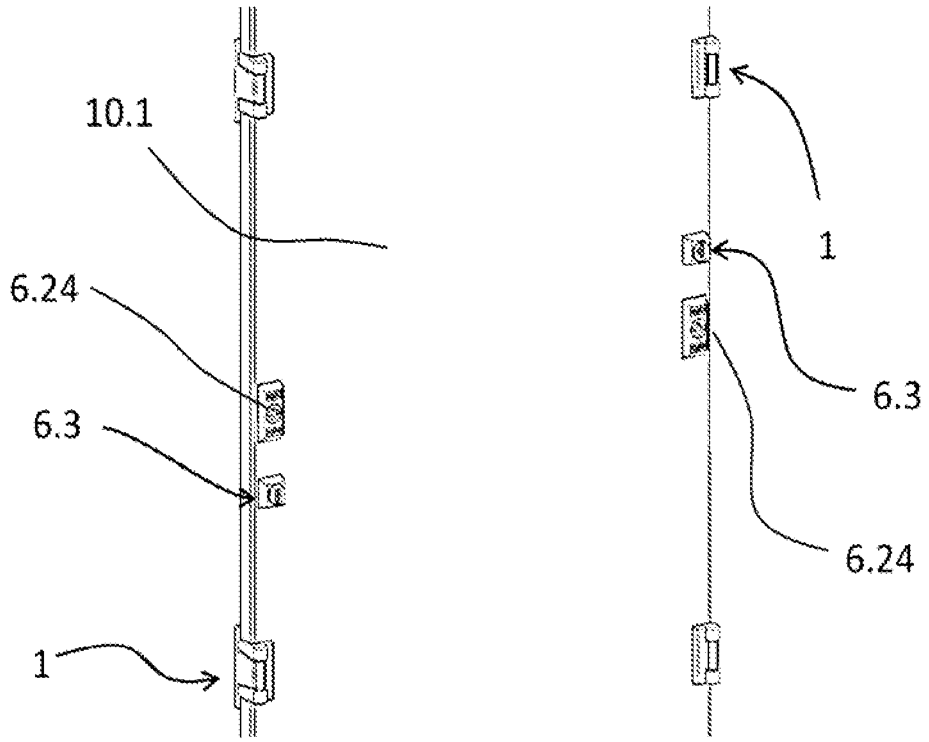
FIG. 4 shows a view of the outer side of the door leaf according to FIG. 2.
Figure 11:
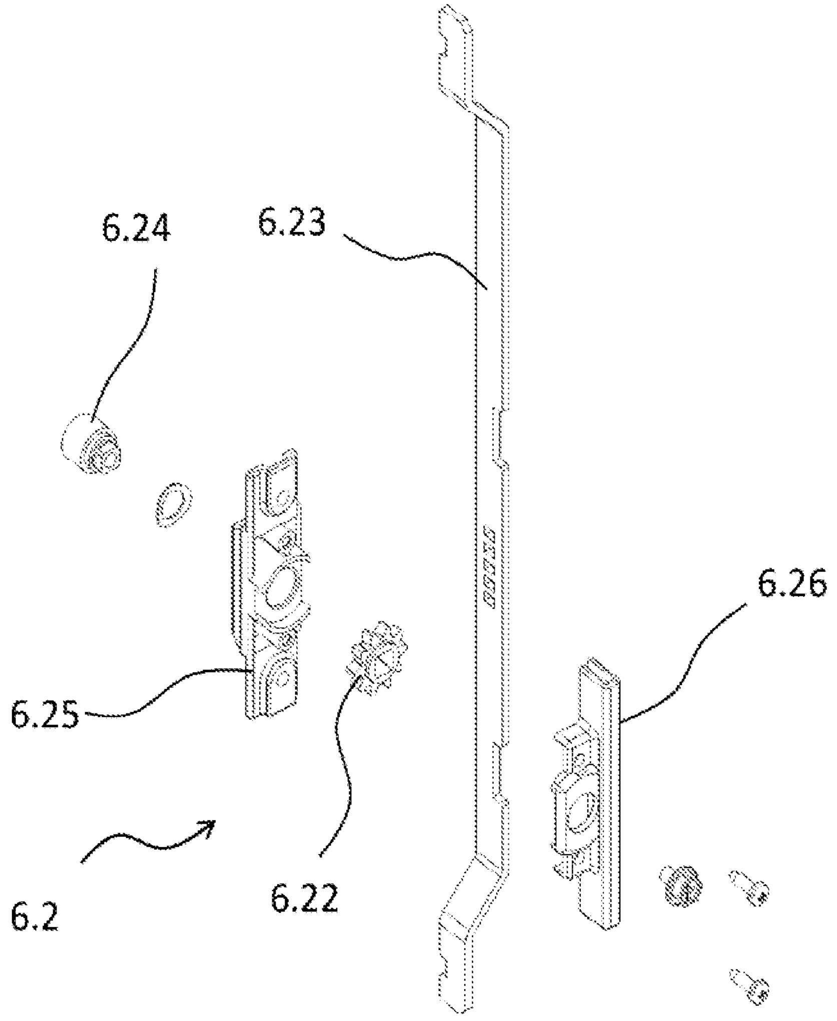
FIG. 11 shows an exploded illustration of an actuating device.
Figure 13A:
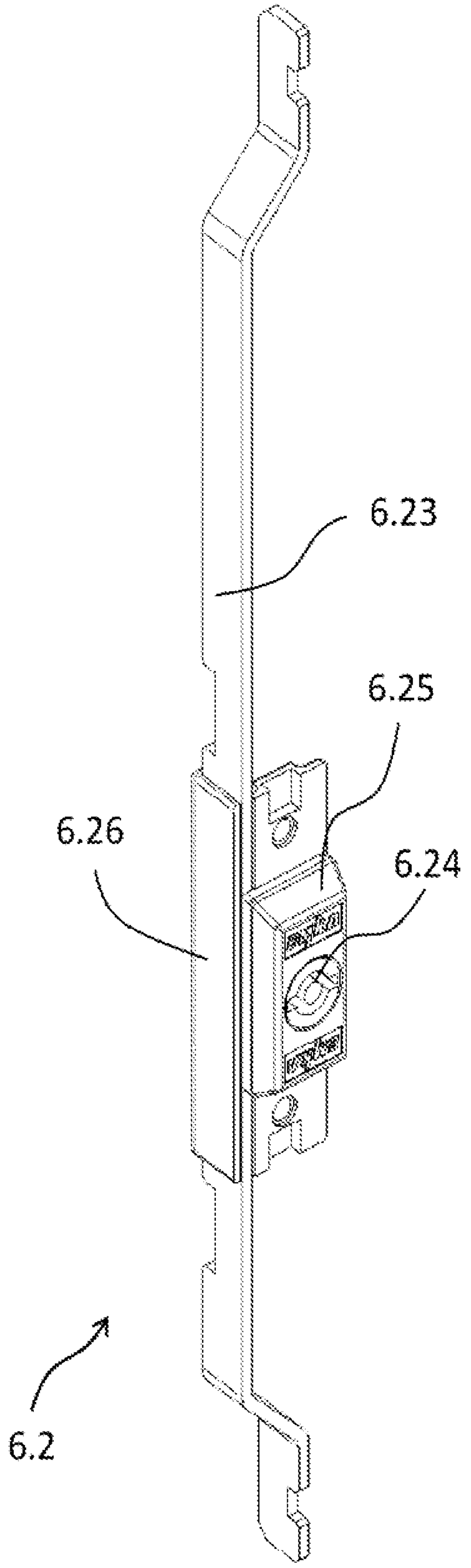
FIG. 13*a* shows a perspective side view of the actuating device according to FIG. 11 having a blocking device according to FIGS. 12*a*, 12*b;*
Figure 13B:
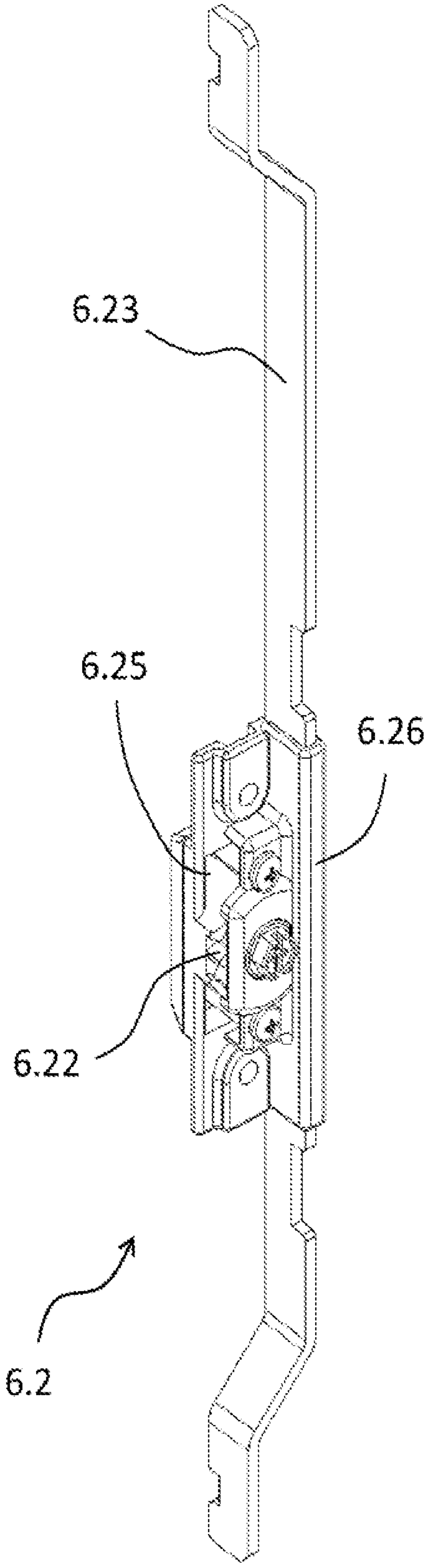
FIG. 13*b* shows a perspective side view of the actuating device according to FIG. 11 having a blocking device according to FIGS. 12*a*, 12*b;*
Figure 14:
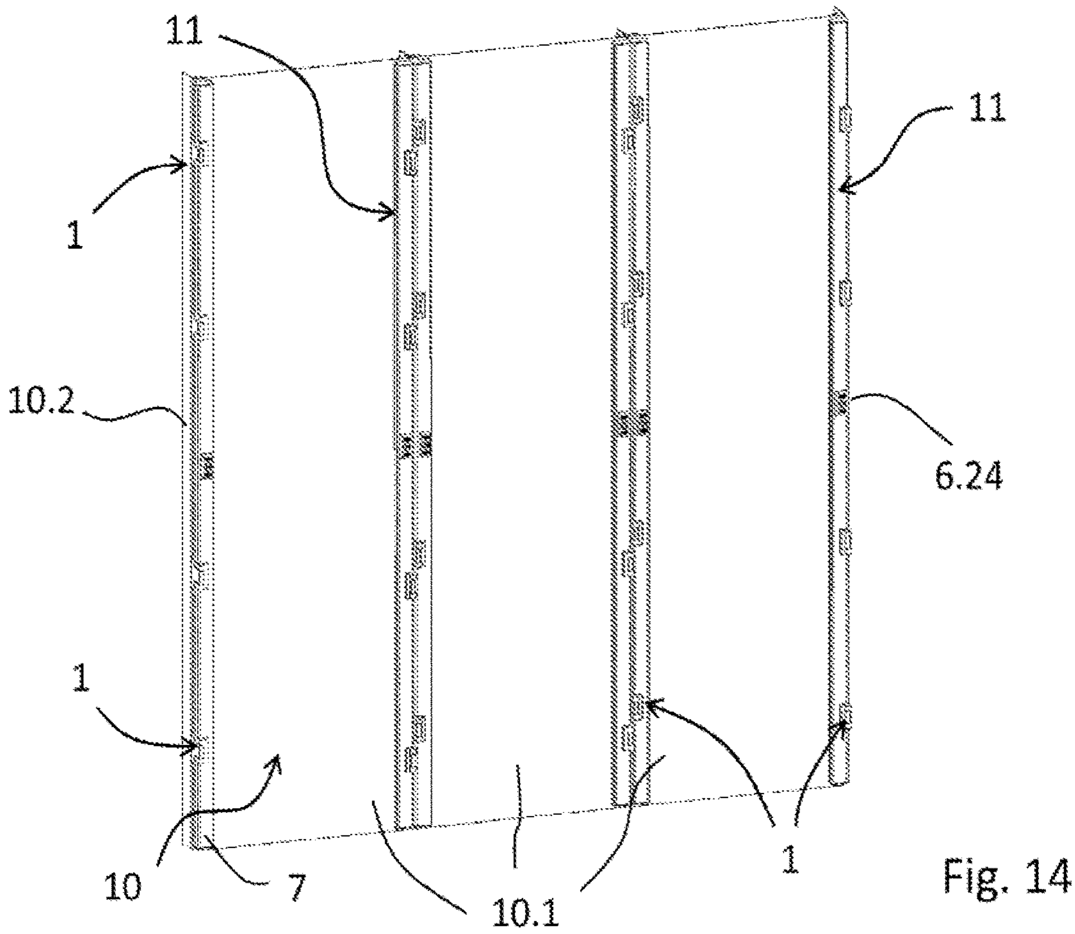
FIG. 14 shows multiple door leaves arranged next to one another, each of which is connected to the respective door frame via eight hinged closures, with the hinged closures being arranged on the outer side of the door leaves.
Figure 15:
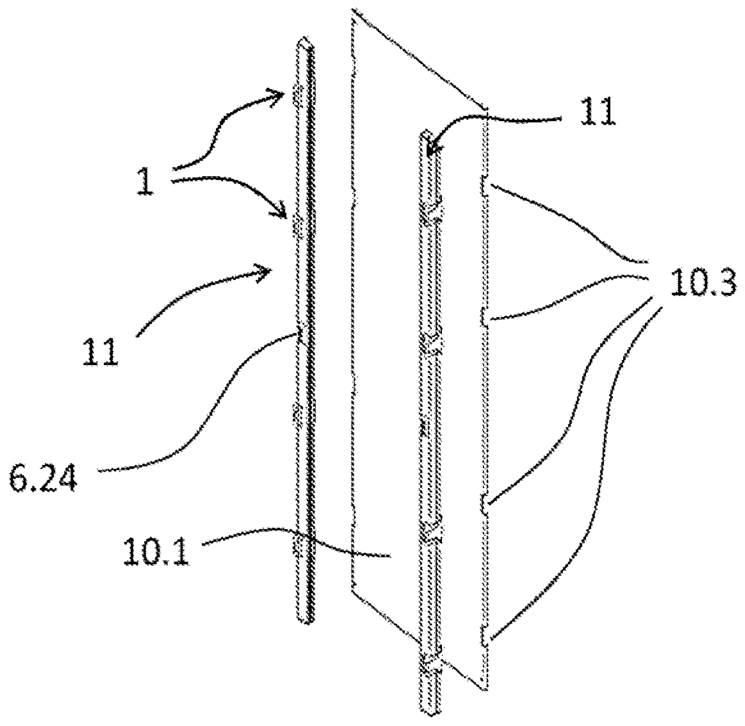
FIG. 15 shows a view of a detail of a door according to FIG. 14 having two hinge assemblies arranged on the outer side of the door leaf.

In order to move the drive rod 6.1 correspondingly, a drive device 6.2 is provided which, together with the drive rod 6.1, forms an actuating device 6. The structure of the drive device 6.2 can be seen in the exploded illustration of FIG. 11. The drive device 6.2 first of all has a rotatable actuating element 6.24, which in the exemplary embodiment is in the form of tool actuation means, as can also be seen for example on the basis of FIG. 4 or FIG. 13*a*. As an alternative, however, the actuating element 6.24 may also be in the form of handle actuation means, knob actuation means, or pawl actuation means. The actuating element 6.24 is supported rotatably in the drive housing 6.25, and the drive housing 6.25 is connected to the hinge bar 7 via mounting points 7.6, which can be seen in FIG. 7*a*. The drive housing 6.25 likewise serves as a support for a pinion 6.22, which is rotationally coupled to the actuating element 6.24 and accordingly, upon a rotational movement of the actuating element 6.24, also moves correspondingly. The pinion 6.22 meshes with an actuating rod 6.23, which is in the form of a toothed rack and which has multiple recesses arranged next to one another, and, in the manner of a linear drive, has the effect that, when the pinion 6.22 is rotated, the actuating rod 6.23 moves correspondingly linearly in the longitudinal direction of the hinge bar 7. To guide the actuating rod 6.23, a linear guide 6.26 is provided, which likewise is connected to the drive housing 6.25 and therefore is not movable. The connection of the drive housing 6.25 and the linear guide 6.26 via two screws can also be seen in FIGS. 13*a* and 13*b*. Furthermore, it can be seen in particular in FIG. 13*b* that the actuating element 6.24 is secured in the axial direction via a screw so as to be able to rotate together with the pinion 6.22, and is connected to the drive housing 6.25 and to the linear guide 6.26.

At its two ends, the actuating rod 6.23 has hook-shaped connecting portions, via which it can be connected to two drive rods 6.1, that is to say to one on each side. When the actuating element 6.24 brings about the movement of the actuating rod 6.23, two drive rods 6.1 are consequently jointly set in motion. Since each drive rod 6.1 is coupled to two respective latches 4 via the guide slots 6.11 arranged in pairs, it is consequently possible for all four latches 4 of the hinge assembly 11 to be jointly moved in the same direction back and forth between the locking position V and the unlocking position E by the drive device 6.2. In one development, it would also be possible to also couple the drive rods 6.1 to further drive rods 6.1, in order thus also to actuate still more latches 4 at the same time.

Figure 12A:
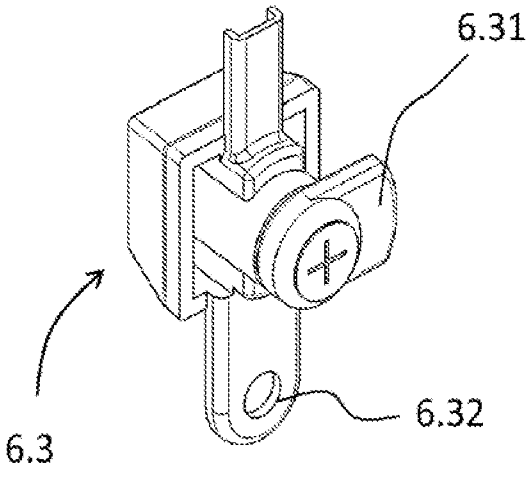
FIG. 12*a* shows a perspective front view of a blocking device.
Figure 12B:
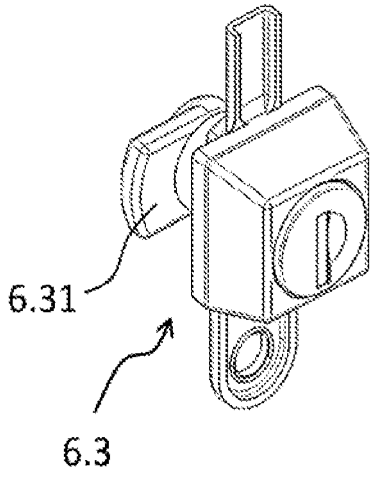
FIG. 12*b* shows a perspective rear view of a blocking device.

FIGS. 12*a* and 12*b* show a blocking device 6.3, which is likewise part of the drive device 6.2. The blocking device 6.3 has a movable blocking tongue 6.31, which can be rotated back and forth in the manner of a casement lock. In the blocking position, the blocking tongue 6.31 engages in the recesses, which can be seen in FIG. 11, of the actuating rod 6.23 and then consequently prevents a movement of the actuating rod 6.23. As a result of the fact that the actuating rod 6.23 is coupled to the actuating element 6.24, by blocking the actuating rod 6.23, the actuating element 6.24 can then at the same time also no longer be rotated.

The blocking device 6.3 can be plugged into the drive housing 6.25 via a connecting region 6.32 and can be connected to the drive housing 6.25 by a screw. As can be seen on the basis of the various positions of the blocking device 6.3 in FIG. 4, the blocking device 6.3 may be arranged both below and above the drive housing 6.25. Accordingly, the drive housing 6.25 correspondingly also has two receptacles, into which the blocking device 6.3 can be plugged. The entire drive device 6.2, irrespective of whether a blocking device 6.3 is provided or not, may be in the form of a premounted mounting unit, which as a whole can be mounted on the hinge bar 7, as will be explained in more detail below on the basis of FIGS. 7*a* to 7*f*. This mounting unit can also be seen in FIGS. 13*a*, 13*b*.

As was already described above, the hinged closures 1, which are arranged in an end region of the door leaf 10.1, are mounted together on a hinge bar 7. This hinge assembly 11 is in the form of a premounted mounting unit and as a whole can be connected to the door leaf 10.1.

Figure 6B:
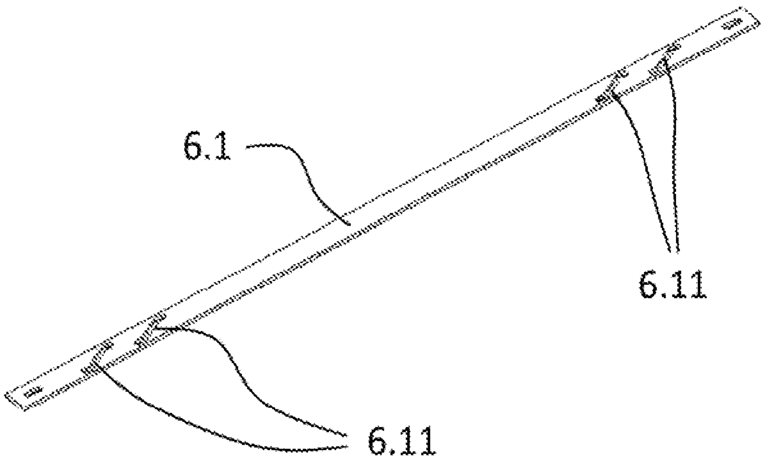
FIG. 6*b* shows a perspective view of a drive rod.

The figures show two different configurations of the hinge assembly 11, specifically one in FIGS. 1 to 4, which is a hinge assembly 11 connected to the inner side of the door leaf 10.1, with the result that the hinge bar 7 cannot be seen from the outside and is concealed between the door leaf 10.1 and the door frame 10.2. In another configuration, in which the hinge bar is arranged on the outer side of the door leaf 10.1, as illustrated for example in FIGS. 14 to 17, the hinge bar 7, or the hinge assembly 11, can be seen also from the outside. The hinge bar 7, or the hinge assemblies 11, of the two exemplary embodiments differ only slightly in terms of their design. Basically, it is therefore possible to premount a basic hinge bar which then, depending on whether it is to be used for internal mounting on the door leaf inner side or for external mounting on the door leaf outer side, can be adapted to the corresponding use case with only little effort. On the basis of FIGS. 7*a* to 7*f* and the sectional views of FIGS. 8 to 10, now first of all the internal mounting of the hinge assembly 11 will be described. The configuration of the hinge elements 2, 3 that was described in FIGS. 5*a*, 5*b* and 6, and the drive device 6.2, are basically usable both for internal mounting and for external mounting.

Figure 7A:
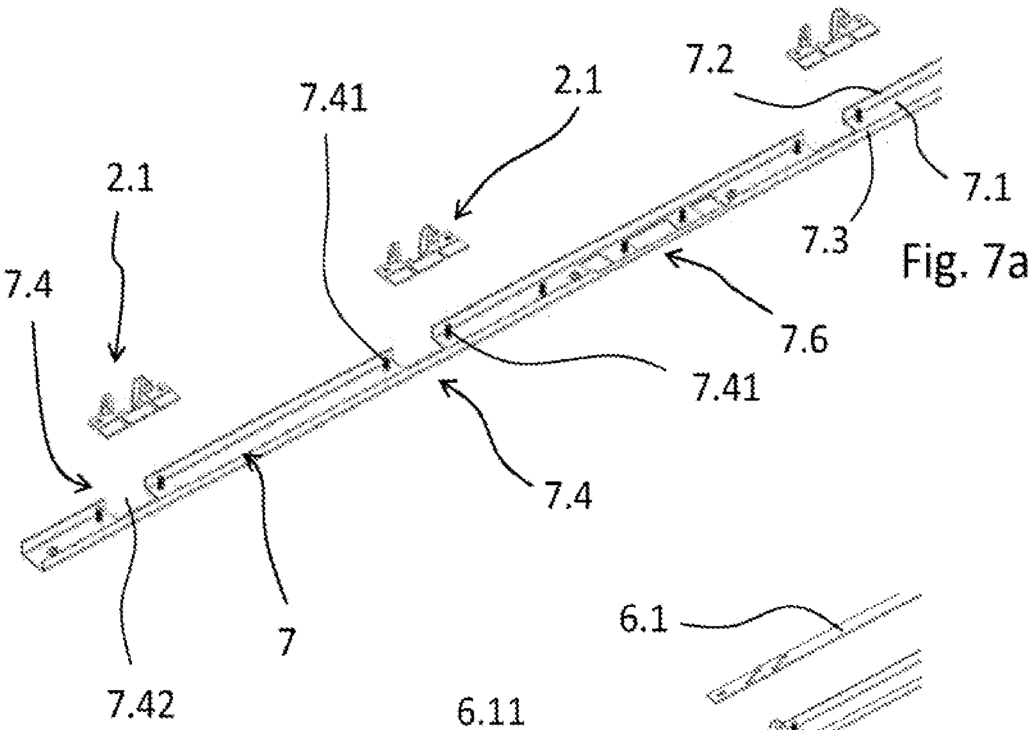
FIG. 7*a* shows a mounting step for mounting a hinge assembly that can be mounted on the inner side of a door leaf.
Figure 7B:
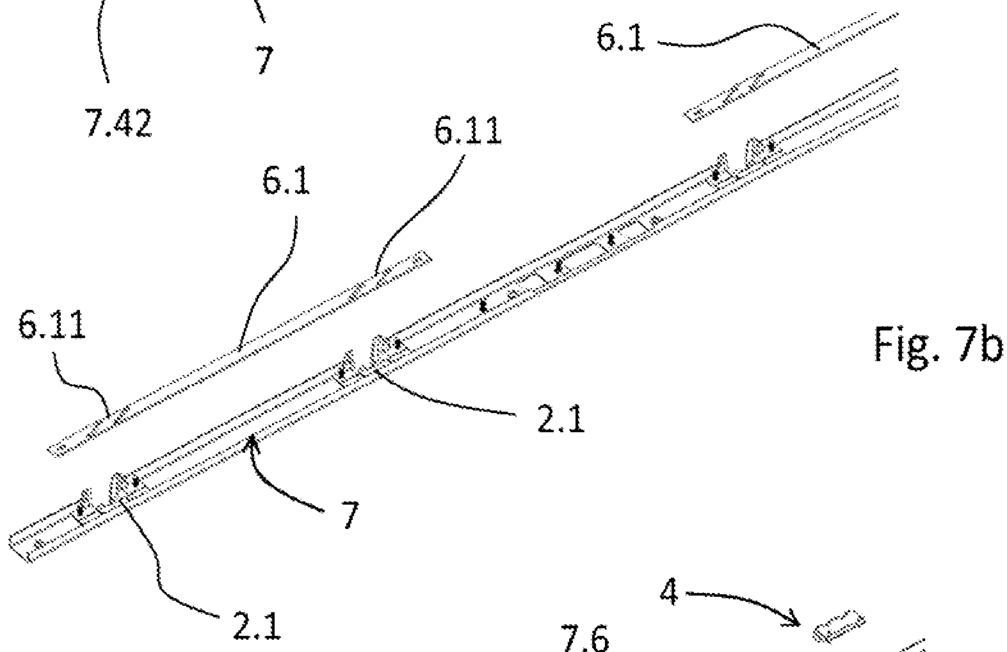
FIG. 7*b* shows another mounting step for mounting a hinge assembly that can be mounted on the inner side of a door leaf.

According to the illustration in FIG. 7*a*, the hinge bar 7 has a basic element 7.1, which rests on the surface of the door leaf 10.1 after mounting. A first limb element 7.2, which bears against a bent edge of the door leaf 10.1 in the case of internal mounting of the hinge bar 7, extends perpendicularly from this basic element 7.1, as can be seen in FIG. 8*b*. At the end of the basic element 7.1 which is opposite the first limb element 7.2, there is arranged a second limb element 7.3, which is bent with respect to the basic element 7.1 and forms a smaller angle with it than the first limb element 7.2 does. In the exemplary embodiment, the angle between the second limb element 7.3 and the basic element 7.1 is approximately 60 degrees. Furthermore, the hinge bar 7 has multiple mounting points 7.4, each of which serves to mount a hinged closure 1. The mounting points 7.4 each have two mounting bolts 7.41, which extend perpendicularly to the basic element 7.1 and are fixedly connected to the basic element 7.1. Via these mounting bolts 7.1, the hinged closures 1, or the hinge base 2.1 and the latch holder 2.2, can be connected both to one another and to the hinge bar 7. Furthermore, the mounting points 7.4 have a respective mounting recess 7.42, which extends both through the basic element 7.1 and through the first limb element 7.2, as can be seen in the illustrations of FIGS. 7*a* to 7*e*.

When mounting a hinged closure 7, it is then the case that firstly the hinge base 2.1 is placed into the mounting recess 7.42, with the result that the mounting bolts 7.41 penetrate the bores of the hinge base 2.1 that are provided for this. Owing to the size of the mounting recesses 7.42, which is adapted to the hinge base 2.1, and owing to the position of the mounting bolts 7.41, the hinge basis 2.1 can be placed into the hinge bar 7 only in a predefined position. The rear side, facing the pivot pin receptacle 2.17, of the mounting portion 2.18 then rests on the inner side of the basic element 7.1 of the hinge bar 7, and the pivot pin receptacle 2.17 projects beyond the hinge bar 7, as can be seen for example also in FIGS. 8*a* and 8*b*.

After the hinge base 2.1 has been mounted, the drive rod 6.1 is inserted into the hinge bar 7, with the result that said drive rod extends parallel to the basic element 7.1. Owing to the drive rod sliding surface 2.16, which is recessed with respect to the mounting portion 2.8, the drive rod 6.1 can be placed against the corresponding edge of the hinge base 2.1, with the result that the guides 2.11 lie under the guide slots 6.11 and, owing to the overlap, a substantially circular passage through the drive rod 6.1 and the hinge base 2.1 is produced.

Figure 7C:
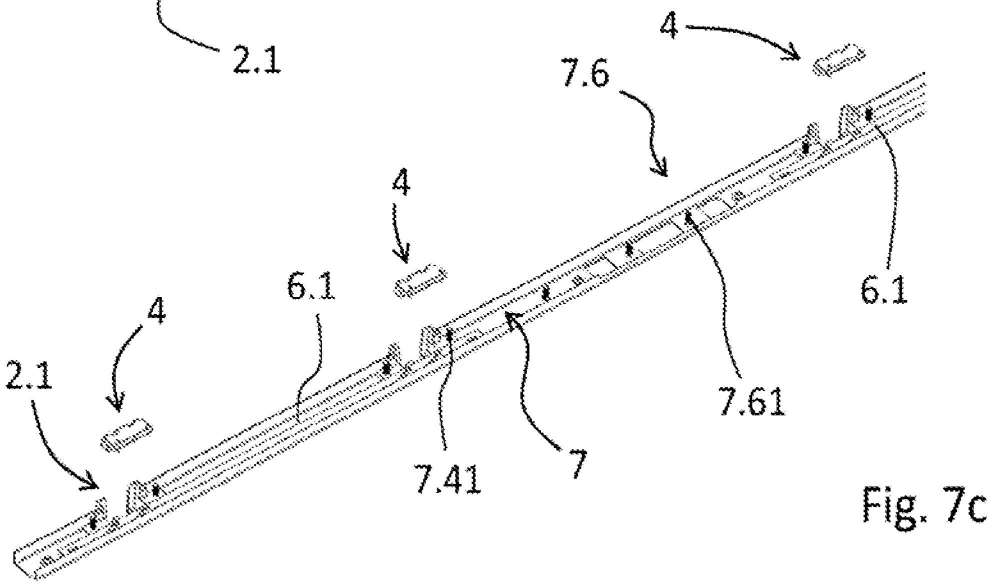
FIG. 7*c* shows another mounting step for mounting a hinge assembly that can be mounted on the inner side of a door leaf.
Figure 7D:
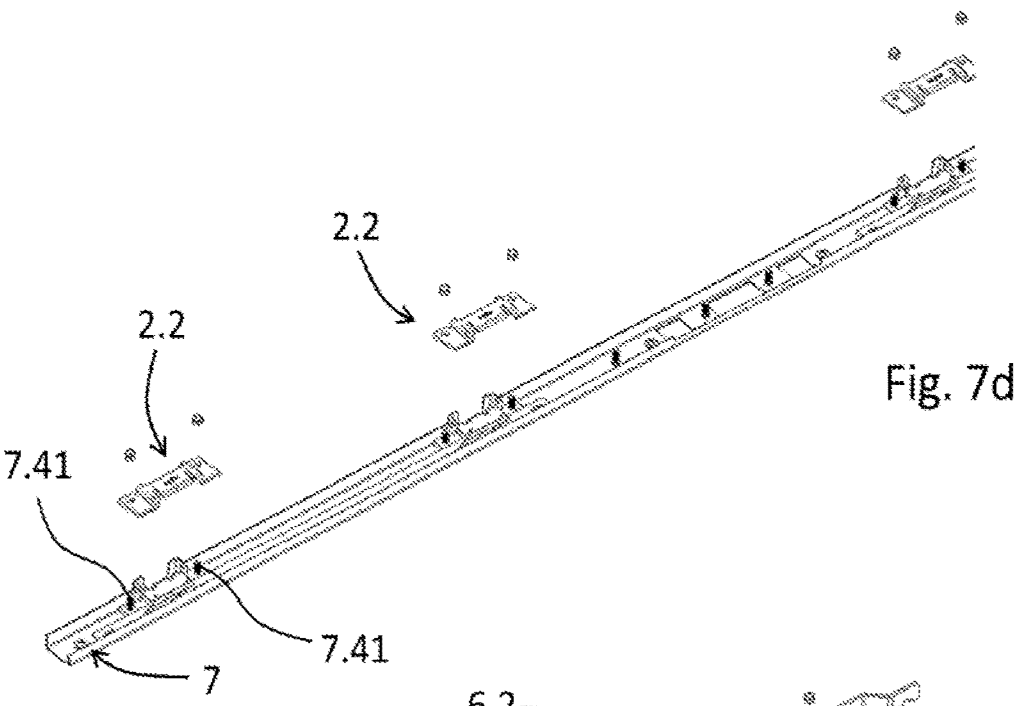
FIG. 7*d* shows another mounting step for mounting a hinge assembly that can be mounted on the inner side of a door leaf.

In a subsequent step, the latch 4 is then placed into the hinge base 2.1, as can be seen in FIG. 7*c*. Two of the four overall guide elements 4.11 then extend through the two guide slots 6.11, arranged parallel to one another, of the drive rod 6.1 as far as the guides 2.11 of the hinge base 2.1. In this respect, the latching portion 4.2 of the latch 4 faces in the direction of the pivot pin receptacle 2.17. Subsequently, the latch holder 2.2 is then mounted and positioned in such a way that the two mounting bolts 7.41 extend through the two bores in the connecting projection 2.24 of the latch holder 2.2. The latch holder 2.2 then engages around the latch 4 and secures it against inadvertent movement. In the process, the guide elements 4.11 of the latch 4 extend into the guides 2.21 of the latch holder 2.2, and the latch 4 can move only linearly in the latching direction R. To move the latch 4, it is then possible to move the drive rod 6.1 perpendicularly to the latching direction R, as was already described above. In a final step, then the latch holder 2.2, and thus also the latch 4, and the hinge base 2.1 are fastened to the hinge bar 7 via nuts that can be screwed onto the mounting bolts 7.41, as can be seen in FIG. 7*d*. Furthermore, it can also be seen that the drive rod 7 is connected to two hinged closures 1, or to two latches 4, and/or that the guide elements 4.11 of two latches 4 are each guided in guide slots 6.11, arranged in the two end regions, of the guide rod 6.1.

Figure 7E:
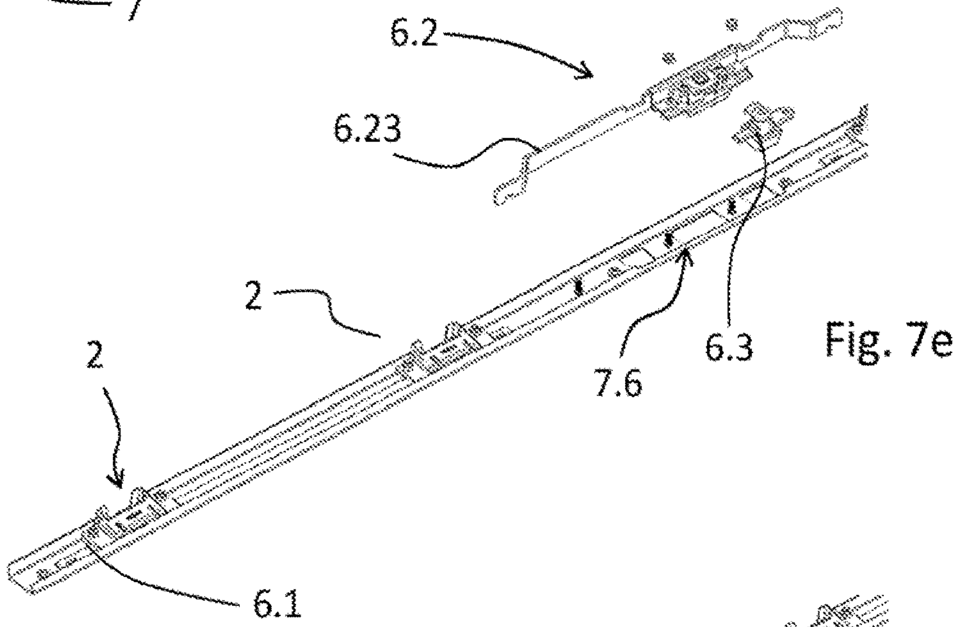
FIG. 7*e* shows another mounting step for mounting a hinge assembly that can be mounted on the inner side of a door leaf.

Since the first hinge element 2 and the drive rods 6.1 for moving the latch 4 have then been mounted in the hinge bar 7, the drive device 6.2 which makes it possible to move the drive rods 6.1 can be mounted. As was already described above, the drive device 6.2 is in the form of a premounted mounting unit, with the result that it can be mounted as a whole in the hinge bar 7. The hinge bar 7 has a mounting point 7.6 for the drive device 6.2, which mounting point has suitably aligned mounting bolts 7.61 and corresponding recesses, with the result that the actuating element 6.24 can be actuated from the outside. As can be seen in FIG. 7*e*, the mounting point 7.6 has both a recess for the blocking device 6.3 arranged above the drive housing 6.25 and a recess for a blocking device 6.3 arranged under the drive housing 6.25. In practice, however, only one of these two recesses is provided, or one of the recesses is closed by a blind cover plate.

After mounting the drive device 6.2, the hook-shaped connecting portions at the ends of the actuating rod 6.23 engage in the correspondingly configured portions of the drive rod 6.1, with the result that the actuating rod 6.23 is coupled via its two end regions to two drive rods 6.1. Here, the actuating rod 6.23 in the form of a flat rod is arranged parallel to the first limb element 7.2 and thus also perpendicularly to the drive rod 6.1, which is likewise in the form of a flat rod. Via the drive device 6.2, it is then possible to jointly actuate all four hinged closures 1 at the same time. When the hinge bar 7 is correspondingly fitted with the hinged closures 1 and the drive device 6.2, this hinge assembly 11 as premounted mounting unit can then be arranged on the inner side of a door leaf 10.1. According to FIG. 3, for this purpose mounting bolts 10.4 may be arranged on the door leaf inner side, via which mounting bolts the hinge bar 7 can then be screwed onto the door leaf 10.1.

Figure 3:
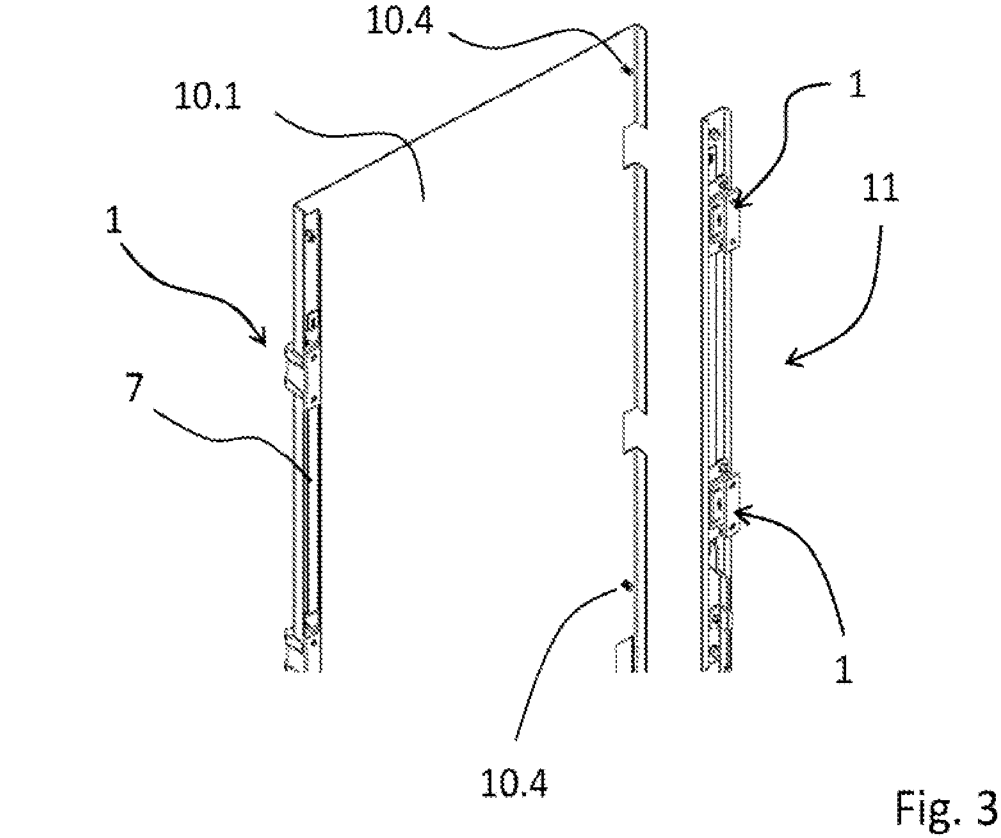
FIG. 3 shows the door according to FIG. 2 in a view of the inner side of the door leaf.

It can be seen in FIG. 3 that it is also the case that the second hinge elements 3 are already connected to the first hinge elements 2. For this, the latch 4 must be transferred to the unlocking position E, and the second hinge elements 3 can then be pushed into the first hinge elements 2, with the result that the pivot pins 3.2 of the second hinge elements 3 then lie in the pivot pin receptacles 2.17 of the hinge base 2.1. After this, the latches 4 are transferred back to the locking position V, in order to secure the pivot pin 3.2 between the latch 4 and the pivot pin receptacle 2.7. The door leaf 10.1 can then be fastened to the door frame 10.2 by fastening the second hinge elements 3 to the latter. As an alternative, it is also possible to arrange the second hinge elements 3 on the door frame 10.2 first of all and to plug the door leaf 10.1, or the corresponding hinge bases 2.1, onto the second hinge elements 3.

Figure 7F:
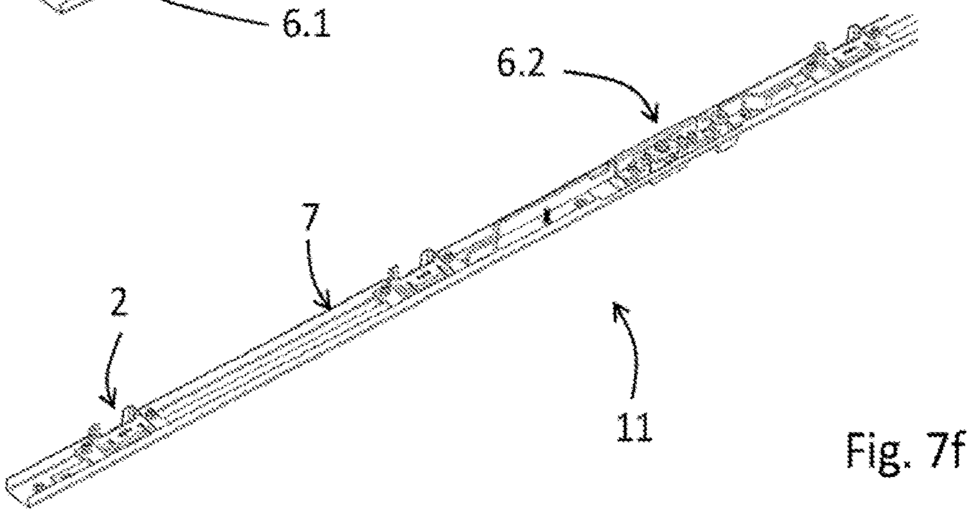
FIG. 7*f* shows another mounting step for mounting a hinge assembly that can be mounted on the inner side of a door leaf.
Figure 8A:
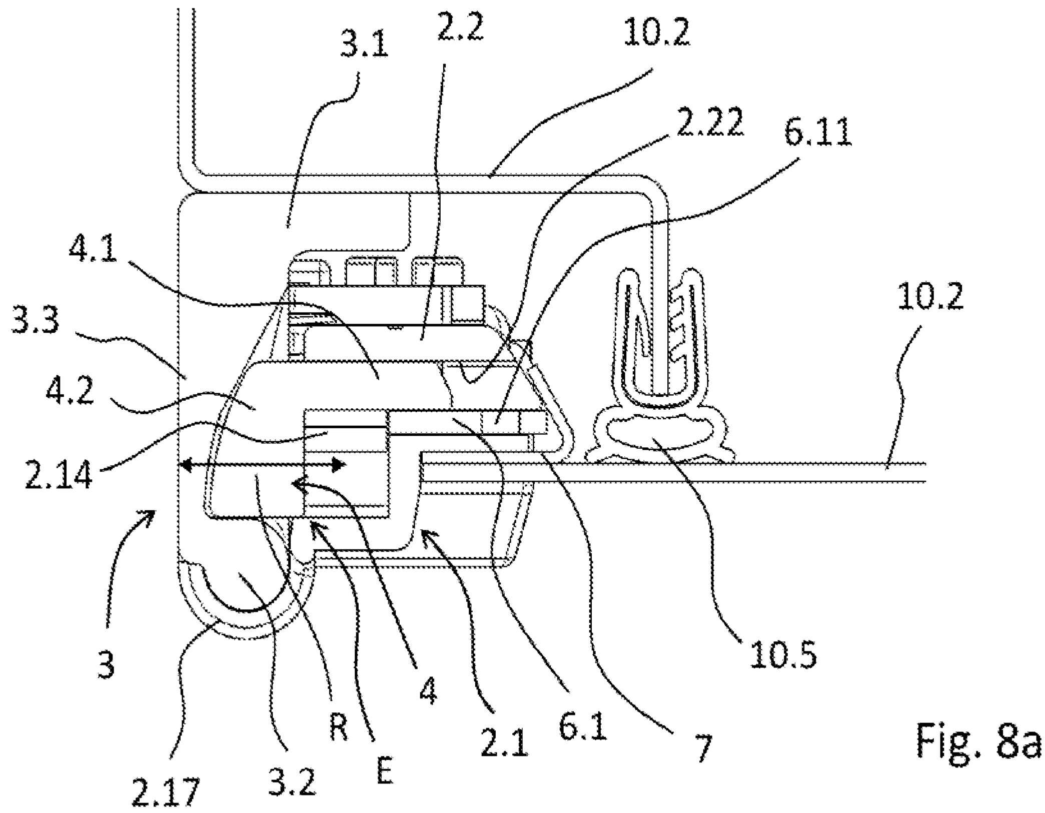
FIG. 8*a* shows a cross section through a door having a hinge assembly arranged on the inner side of the door leaf in a locking position.
Figure 8B:
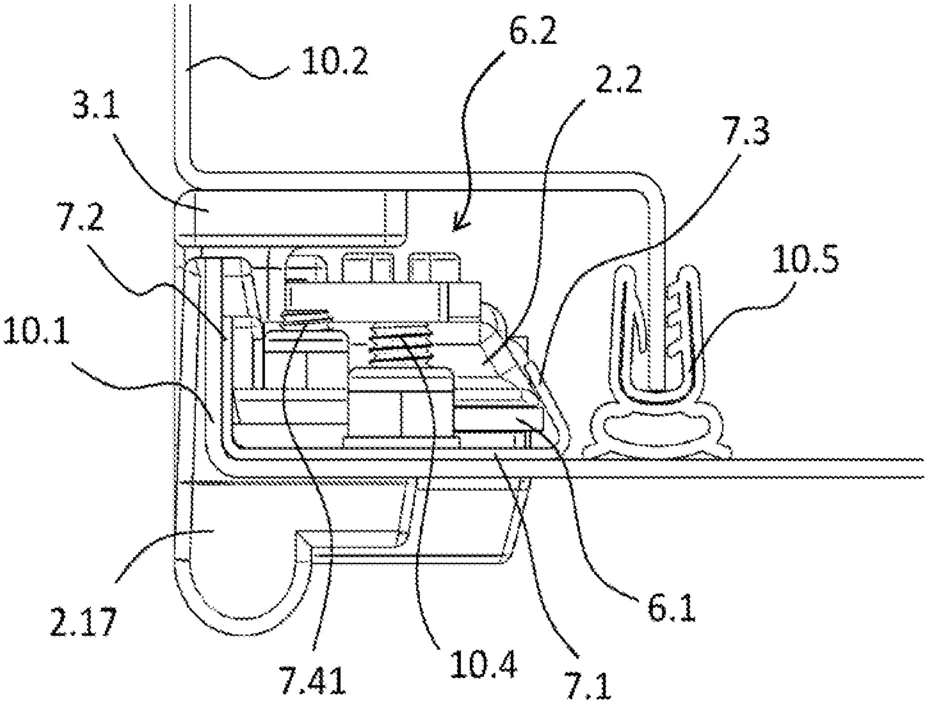
FIG. 8*b* shows another cross section through a door having a hinge assembly arranged on the dinner side of the door leaf in a locking position.

FIGS. 8*a* and 8*b* show one end region of the door leaf 10.1 in a closed position. The door frame 10.2 has a shoulder, at the end of which there is arranged a seal 10.5, which is compressed by the door leaf 10.1 in the closed position. Furthermore, the shoulder, extending in the free frame cross section, of the door frame 10.2 has a mounting region, which extends parallel to the surface of the door leaf 10.1 and on which the second hinge element 3 is arranged. The hinge assembly 11 illustrated in FIG. 7*f* is arranged on the inner side, which faces the door frame 10.2, of the door leaf 10.1. In this respect, FIG. 8*a* corresponds to a sectional view through the latch 4. Accordingly, it is also possible to see only part of the basic element 7.1 and the second, bent limb element 7.3 of the hinge bar 7. The latch 4 is in the locking position V, with the result that it secures the pivot pin 3.2 in the pivot pin receptacle 2.17 and no translational movement of the two hinge elements 2, 3, but only a rotational movement about the pivot axis S, is possible. The drive rod 6.1 can be seen in the form of a flat element in FIG. 8*a*, and is moved in the viewing direction, that is to say perpendicularly to the plane of the page, for the purpose of moving the latch 4. Also clearly visible is the free space into which the latch 4 is moved in the course of transferring from the locking position V to the unlocking position E. In the background can be seen the drive device 6.2, or the screw, via which the actuating element 6.24 and the pinion 6.22 are secured to the drive housing 6.25 in the axial direction.

Also visible in FIG. 8*b* is the entire hinge bar 7, that is to say also the first limb element 7.2, which bears against a bent edge of the door leaf 10.1 that faces in the direction of the door frame 10.2. Since the hinge element 1 is not illustrated in a sectional view in the view according to FIG. 8*b* itself, the latch 4 received between the hinge base 2.1 and the latch holder 2.2 inside the first hinge element 2 cannot be seen. However, both the mounting bolt 10.4, via which the hinge assembly 11, or the hinge bar 7, is arranged on the inner side of the door leaf 10.1, and the mounting bolt 7.41, via which the hinge base 2.1 and the latch holder 2.2 are connected to the hinge bar 7, can be seen.

Figure 9:
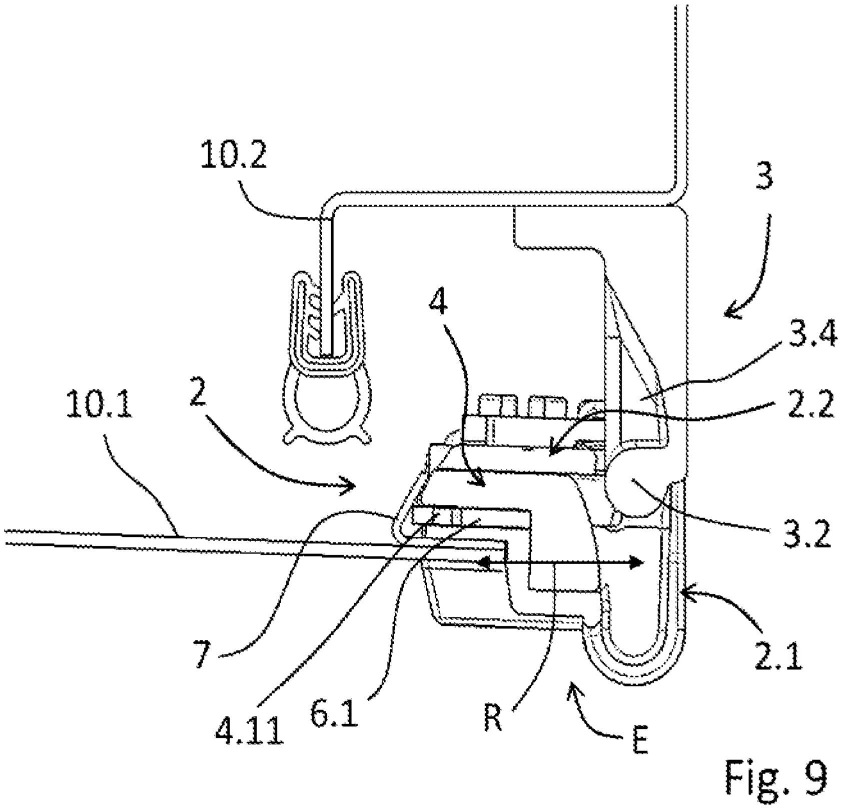
FIG. 9 shows the door according to FIGS. 8*a*, 8*b*, with the hinged closure being in an unlocking position.
Figure 10:
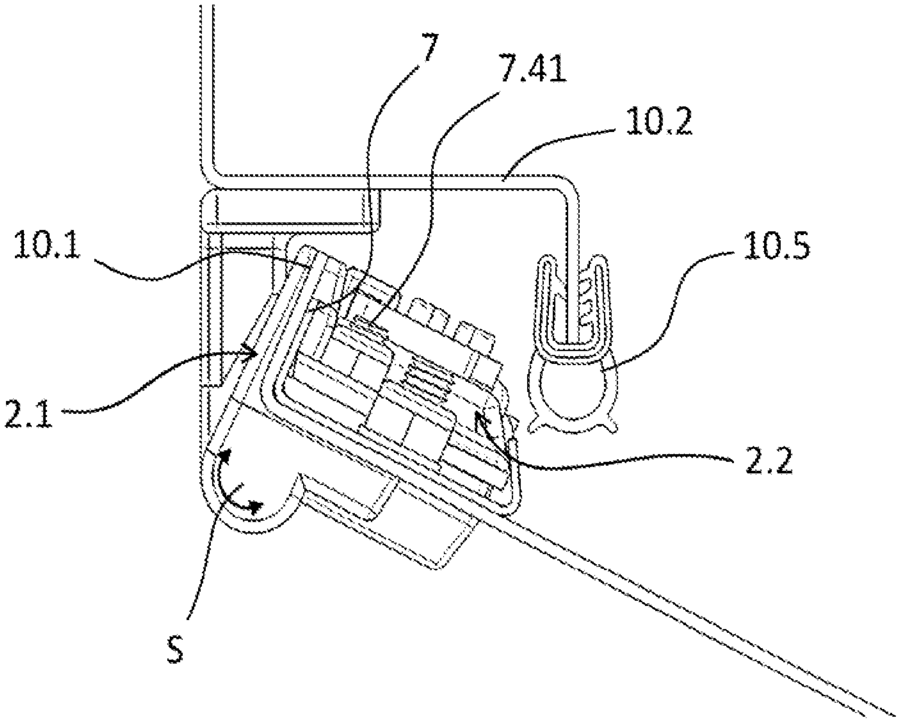
FIG. 10 shows the door according to FIGS. 8*a*, 8*b* in a pivoted position.

The illustration of FIG. 9 basically corresponds to the view of FIG. 8*a*, but the latch 4 is in the unlocking position E, so that the door leaf 10.1 can be moved in translation with respect to the door frame 10.2 and the door leaf 10.1 can be pivoted for example about the left-hand pivot axis S illustrated in FIG. 10. The guide elements 4.1 of the latch 4 are located in the end region of the S-shaped guide slot 6.11, with the result that, in this position, the latch 4 also no longer lies in the receiving region 3.4 between the pivot pin 3.2 and the mounting region 3.1 of the second hinge element 3. FIG. 10 then shows the oppositely situated end region of the door leaf 10.1 in a pivoted position. The hinge elements 1 of the hinge assembly 11 arranged in this end region are in the locking position V, with the result that it is not possible to pivot the door leaf 10.1.

The second configuration, illustrated in FIGS. 14 to 17, relates to a hinge bar 7, or a hinge assembly 11, which is arranged not on the inner side of the door leaf 10.1 but on the outer side of the door leaf 10.1. Since the hinge bars 7 are correspondingly visible from the outside, in addition to the configuration described above, they also have a hinge bar cover plate 7.7 and, at the upper and lower ends, end elements 7.8. The differences of the hinge elements 2, 3 with respect to the first embodiment will be explained in more detail below on the basis of FIGS. 19*a* to 21.

In a similar way to the illustrations in FIGS. 7*a* to 7*f*, FIGS. 18*a* to 18*e* show the mounting of the individual components of the hinge assembly 11. In order to be able to see both end regions of the hinge bar 7, the center region of the hinge bar 7 is also not illustrated in FIGS. 18*d* and 18*e*. Since, however, the drive device 6.2 located in this region is identical to the drive device 6.2 already described above in terms of the hinge assembly 11 suitable for internal mounting, reference is made to the description above with respect to the configuration and attachment of the drive device 6.2.

Figure 18A:
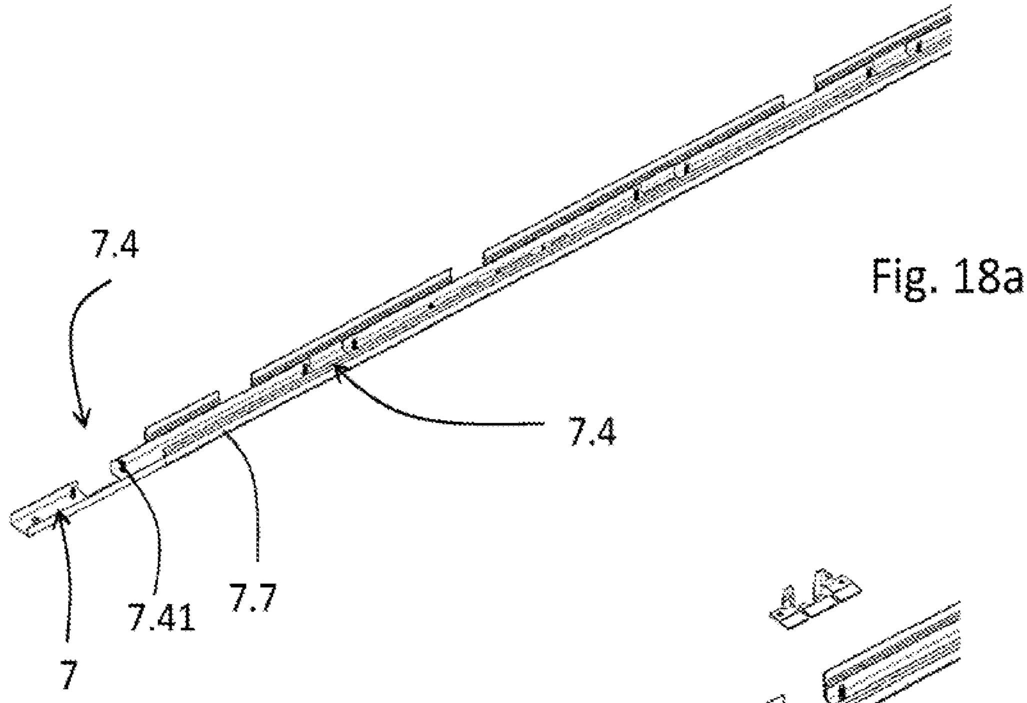
FIG. 18*a* shows a view of a mounting step for mounting a hinge assembly that can be mounted on the outer side of a door leaf.
Figure 18B:
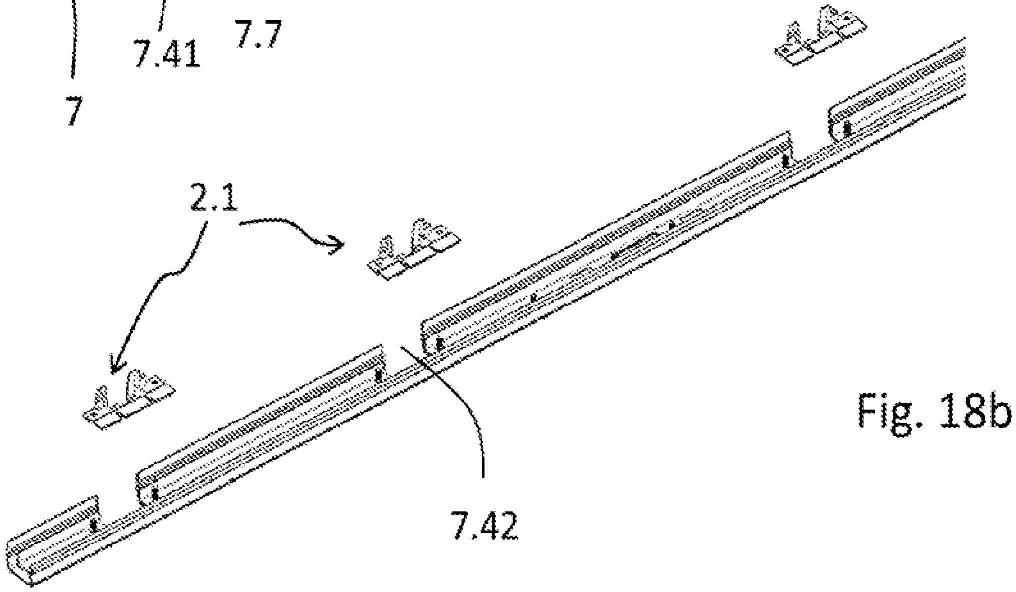
FIG. 18*b* shows a view of another mounting step for mounting a hinge assembly that can be mounted on the outer side of a door leaf.
Figure 18C:
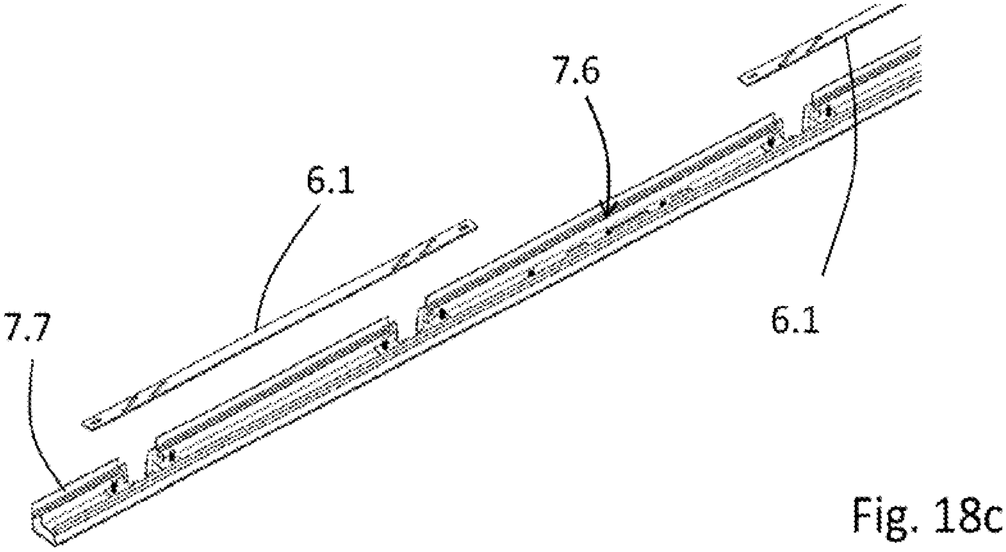
FIG. 18*c* shows a view of another mounting step for mounting a hinge assembly that can be mounted on the outer side of a door leaf.

In the case of the hinge assembly 11 for external mounting, firstly the hinge bar 7 is pushed into the hinge bar cover plate 7.7, as can be seen in FIG. 18*a*. Since the hinge bar 7 is identical both for internal mounting and for external mounting, reference is also made to the above description in this regard. The mounting of the hinge base 2.1 that is illustrated in FIGS. 18*b* and 18*c*, and the drive rod 6.1, are likewise identical to what was described above with regard to FIGS. 7*a* and 7*b*. The mounting of the latch 4 and of the latch holder 2.2 is therefore also not illustrated in FIGS. 18*a* to 18*e*.

Figure 18D:
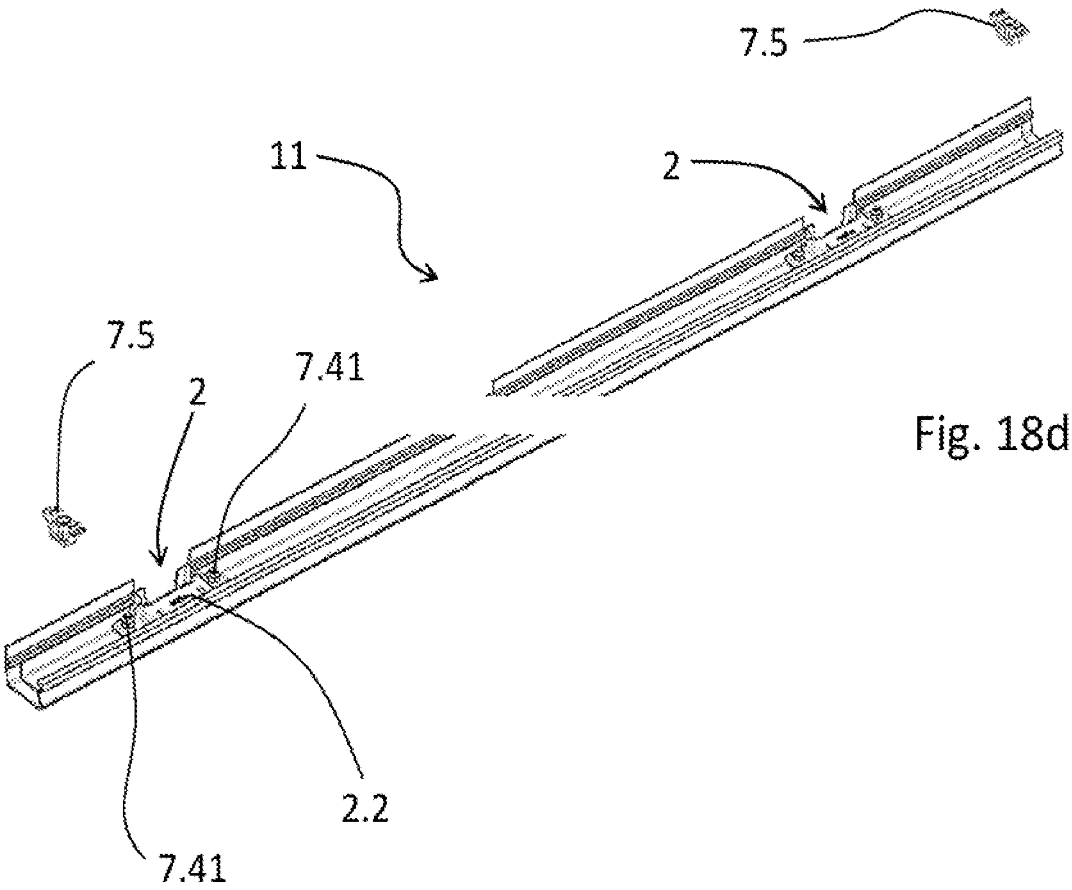
FIG. 18*d* shows a view of another mounting step for mounting a hinge assembly that can be mounted on the outer side of a door leaf.
Figure 18E:
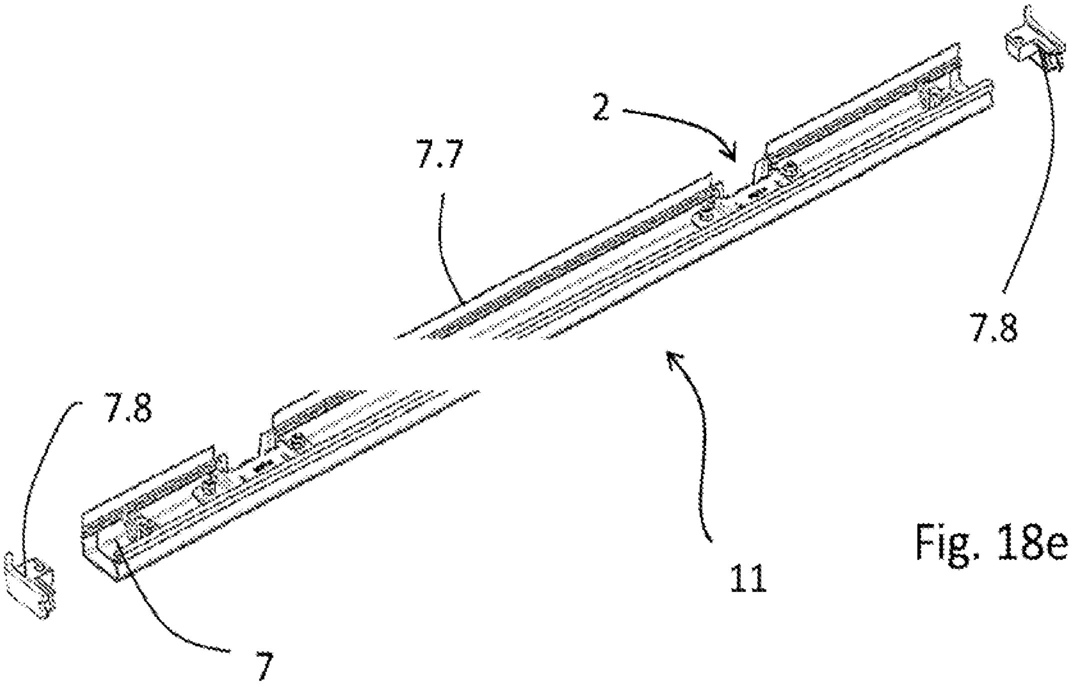
FIG. 18*e* shows a view of another mounting step for mounting a hinge assembly that can be mounted on the outer side of a door leaf.

By contrast to the hinge assembly 11 for internal mounting, the hinge bar cover plate 7.7 is connected to the hinge bar 7 after the first hinge element 2 has been mounted in the case of the hinge assembly 11 for external mounting. For this, a mounting element 7.5 in the form of a pressure piece is used, which is depicted in the illustration of FIG. 18*d*. The pressure piece is supported against the hinge bar 7 and has two projections formed in the manner of wings, which engage behind or in corresponding notches in the hinge bar cover plate 7.7 in the connected position. The pressure piece consequently clamps the hinge bar cover plate 7.7 against the hinge bar 7. For mounting purposes, the pressure piece is firstly introduced into the hinge bar 7 and then rotated by 90°, with the result that the projections engage under the hinge bar cover plate 7.7, or in the corresponding recess. By virtue of the residual stress of the material of the pressure piece, the hinge bar cover plate 7.7 is then connected to the hinge bar 7 in a frictional engagement, with the result that there is no need, for example, for screws that are visible from the outside to be screwed into the hinge bar cover plate 7.7. In a final step, the ends of the hinge bar 7, or of the hinge bar cover plate 7.7, are then also closed by end elements 7.8, as can be seen in FIG. 18*e*.

In a similar way to FIGS. 8*a*, 8*b*, FIGS. 19*a* and 19*b* show the hinge assembly 1 arranged on the outer side of the door leaf 10.1. An essential difference is that the first hinge element 2 is longer for external mounting than for internal mounting. This is associated with the fact that the second hinge element 3 must span not only the distance between the door frame 10.2 and the door leaf 10.2, but additionally also the height of the hinge bar 7. What then also results from this is a pivot axis S which is further away from the door frame 10.2. Nevertheless, the door leaf 10.1 overall is closer to the door frame 10.2 in the case of external mounting, since no or less space is required there for the hinge assembly 11, as is evident from a comparison of FIGS. 19*a* and 8*a*. In addition, what also results is a larger free door frame cross section, since, in the door frame 10.2, all that is required is enough space for mounting the second hinge element 3, but not additionally also for the first hinge element 2, or the hinge bar 7, and the drive actuation means 6.2.

Figure 19A:
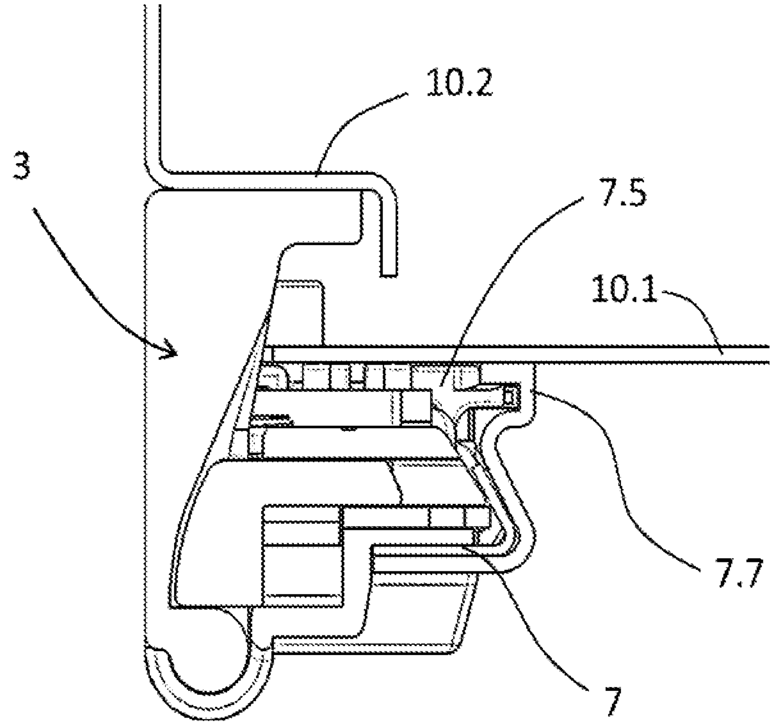
FIG. 19*a* shows a cross section through a door having a hinge assembly arranged on the outer side of the door leaf in a locking position.
Figure 19B:
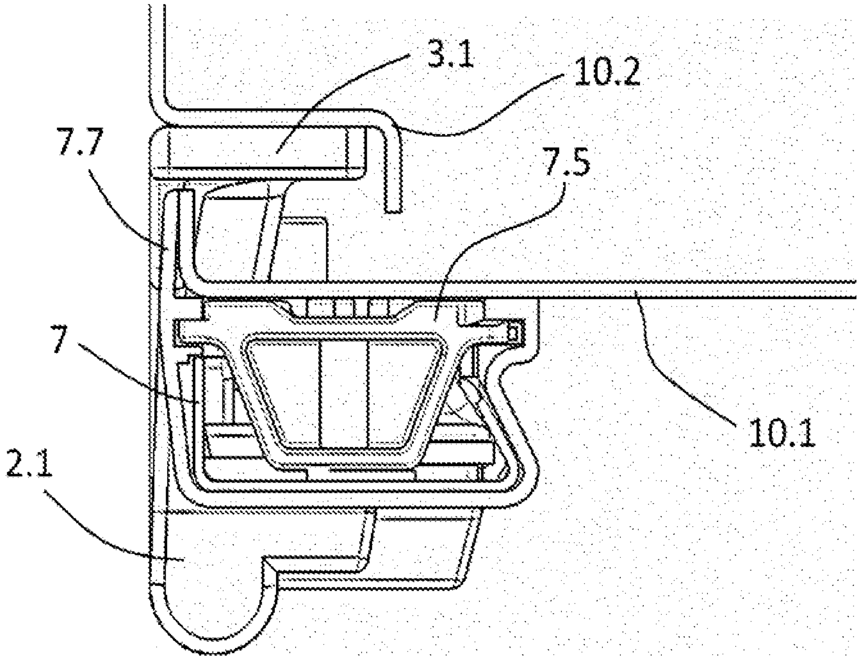
FIG. 19*b* shows another cross section through a door having a hinge assembly arranged on the outer side of the door leaf in a locking position.
Figure 20:
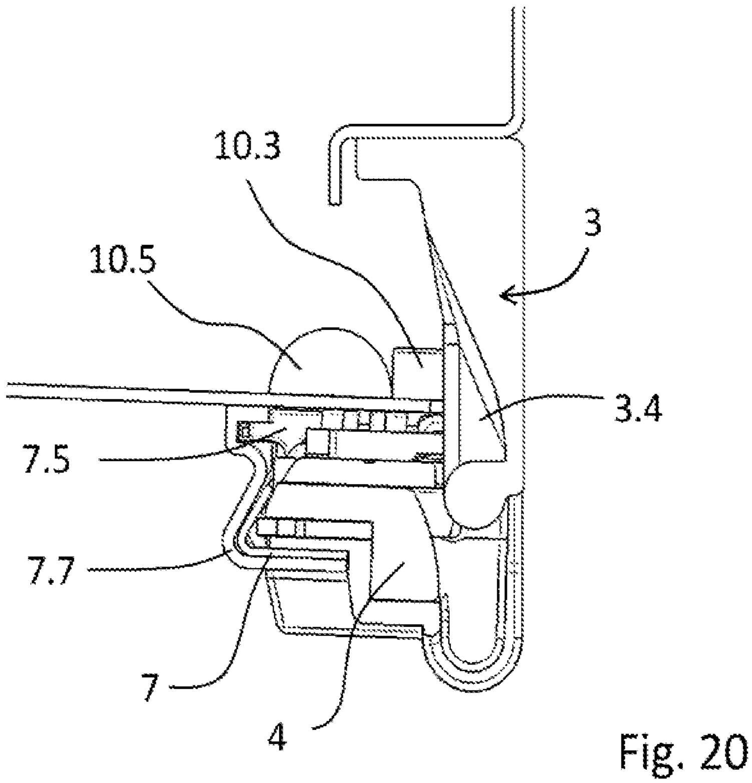
FIG. 20 shows the door according to FIGS. 19*a*, 19*b*, with the hinged closure being in an unlocking position.
Figure 21:
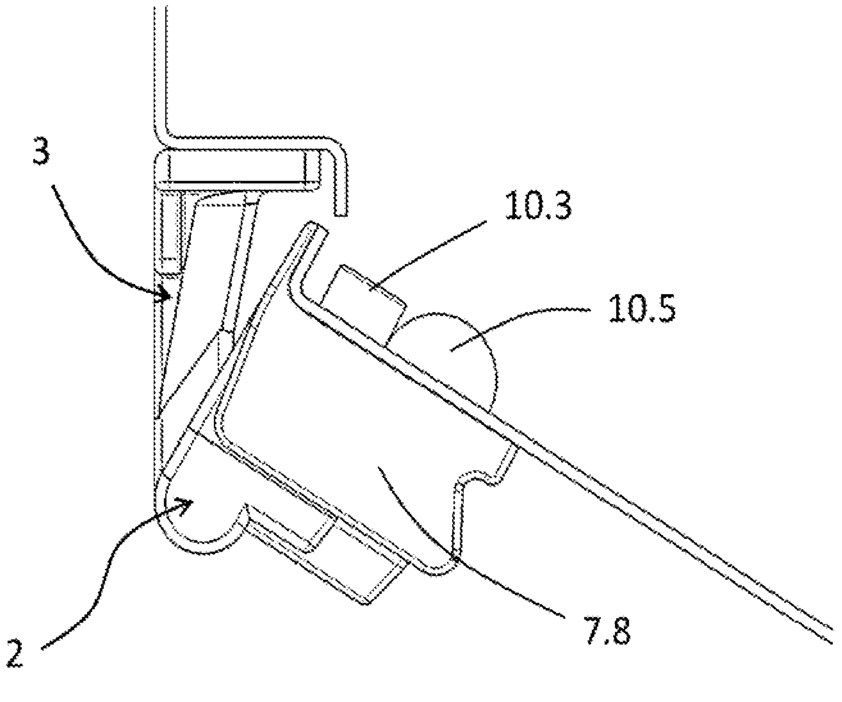
FIG. 21 shows the door according to FIGS. 19*a*, 19*b* in a pivoted position.

What can be seen in FIG. 19*b* is the mounting element 7.5, and also the projections which engage behind the hinge bar cover plate 7.7 and which press the hinge bar cover plate 7.7 against the hinge bar 7 as a result. With regard to FIGS. 20 and 21, reference is made to the description of FIGS. 9 and 10.

Figure 16:
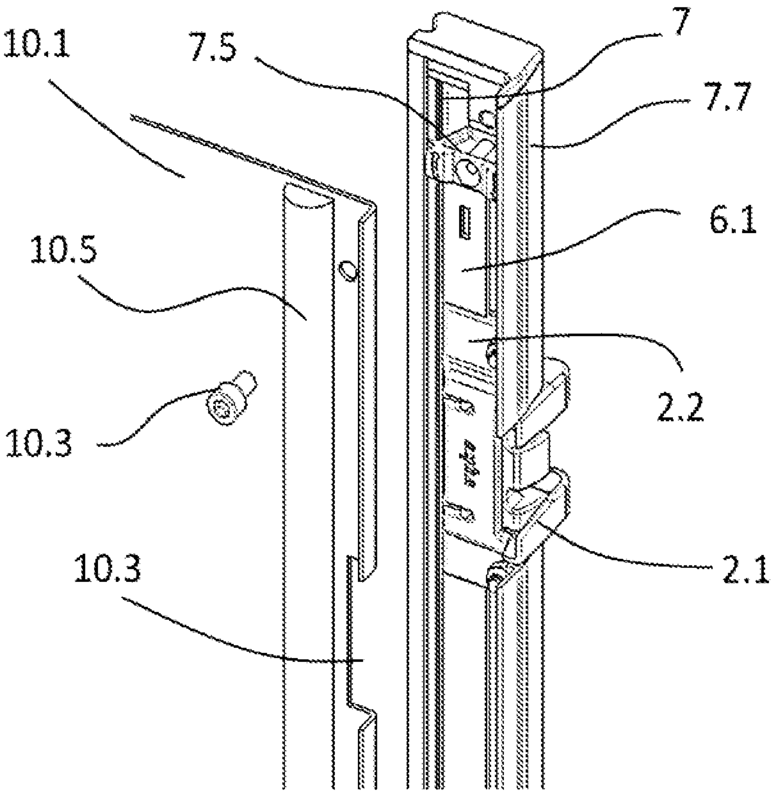
FIG. 16 shows an exploded view of a detail of a hinge assembly mounted on the outer side of the door leaf.
Figure 17:
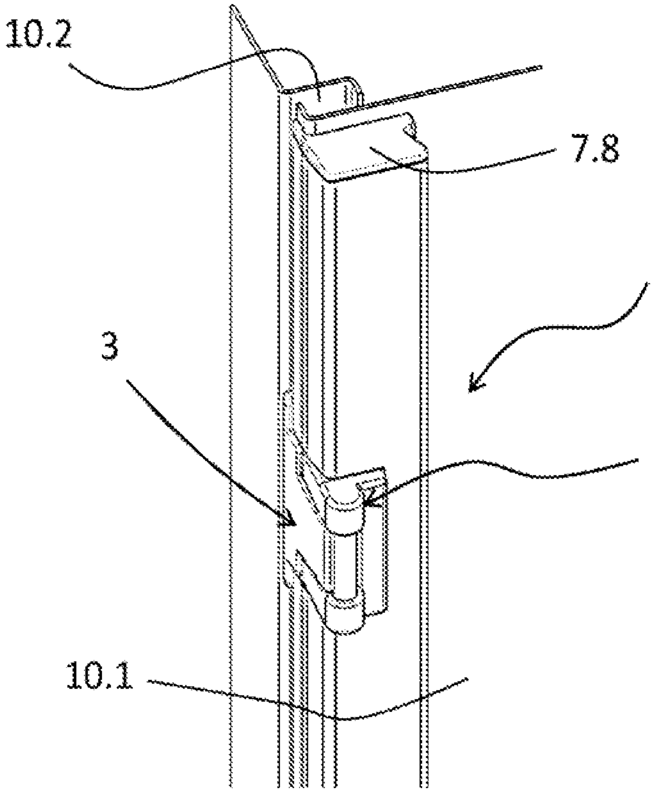
FIG. 17 shows a perspective view of a hinge assembly mounted on the outer side of the door leaf.

In order to fasten the hinge assembly 11 to the outer side of the door leaf 10.1, according to FIG. 16 mounting bolts 10.3 in the form of hexagon socket screws are provided. These mounting bolts are screwed from the inside through the door leaf 10.1 and then into the hinge bar 7, so that no screws can be seen from the outside. As an alternative, it is also possible to screw the screws into the mounting element 7.5.

Overall, the hinge assemblies 11 for internal mounting and for external mounting differ only slightly from one another, with the result that it is possible to easily convert or easily adapt the premounted components.

REFERENCE SIGNS

1 Hinged closure
2 First hinge element
2.1 Hinge base
2.11 Guide
2.14 Guide surface
2.15 Guide projection
2.16 Drive rod sliding surface
2.17 Pivot pin receptacle
2.18 Mounting portion
2.19 Mounting bore
2.2 Latch holder
2.21 Guide
2.22 Latch sliding surface
2.23 Guide surface
2.24 Connecting projection
2.25 Drive rod sliding surface
3 Second hinge element
3.1 Mounting region
3.2 Pivot pin
3.3 Connecting region
3.31 Stiffening ribs
3.4 Receiving region
4 Latch
4.1 Movement portion
4.11 Guide element

4.2 Latching portion
4.21 Recess
4.22 Latching block
5 Connecting elements
6 Actuating device
6.1 Drive rod
6.11 Guide slot
6.2 Drive device
6.22 Pinion
6.23 Actuating rod
6.24 Actuating element
6.25 Drive housing
6.26 Linear guide
6.3 Blocking device
6.31 Blocking tongue
6.32 Connecting region
7 Hinge bar
7.1 Basic element
7.2 First limb element
7.3 Second limb element
7.4 Mounting point
7.41 Mounting bolt
7.42 Mounting recess
7.5 Mounting element
7.6 Mounting point
7.61 Mounting bolt
7.7 Hinge bar cover plate
7.8 End element
10 Door
10.1 Door leaf
10.2 Door frame
10.3 Mounting recess
10.4 Mounting bolt
10.5 Seal
11 Hinge assembly
R Latching direction
S Pivot axis
E Unlocking position
V Locking position Having described the invention in detail and by reference to the various embodiments, it should be understood that modifications and variations thereof are possible without departing from the scope of the claims of the present application.

What is claimed is:

1. A hinge assembly for a door leaf positioned within a door frame, the hinge assembly comprising:

at least two hinged closures configured to be positioned at each side of the door leaf, each hinged closure having a first hinge element configured to be connected to the door leaf and a second hinge element configured to be connected to the door frame, each hinged closure further including a latch configured to cooperate with the first and second hinge elements; and an actuating device configured to be located at each side of the door leaf and configured to be operatively connected to the latch of each hinged closure at the associated side of the door leaf, wherein the actuating device is configured to move the associated latch between a latching position, securing the respective hinged closure, and an unlatched position, releasing the respective hinged closure;

wherein the assembly is configured such that, in use, when one of the actuating devices is actuated, the door leaf is configured for pivoting with respect to the door frame;

the hinge assembly further including a hinge bar which is configured to be positioned on the door leaf and has multiple mounting points configured to be coupled to at least one of the hinged closures, wherein the hinge assembly is configured such that operation of the actuating device causes the latch to move in direction perpendicular relative to an axis about which the door leaf is pivotable.

2. The hinge assembly as claimed in claim 1, wherein the first hinge element and the second hinge element of each hinged closure are configured to be pivoted about a pivot axis in order to enable pivoting of the door leaf.

3. The hinge assembly as claimed in claim 2, wherein the hinge bar extends parallel to the pivot axis.

4. The hinge assembly as claimed in claim 1, wherein the hinge bar is coupled to the door leaf, wherein the hinge bar and the hinged closures are coupled together, and wherein the door leaf is pivotable open such that an outer edge of the door leaf is spaced away from and not coupled to the door frame.

5. The hinge assembly as claimed in claim 1, wherein the hinge bar can be arranged selectively either on a door leaf inner side or on a door leaf outer side.

6. The hinge assembly as claimed in claim 1, wherein each latch is configured to be moved back and forth in a latching direction between the unlatched position and the latching position.

7. The hinge assembly as claimed in claim 1, wherein the actuating device has at least one drive rod for moving at least one latch and a drive device for moving the drive rod.

8. The hinge assembly as claimed in claim 7, wherein the latches of multiple hinged closures can be moved by means of one drive rod, and wherein the drive device has a rotatable actuating element, the rotational movement of which can be converted into a linear movement of an actuating rod.

9. The hinge assembly as claimed in claim 1, wherein each mounting point of the hinge bar has a mounting recess configured to receive at least part of an associated hinged closure therein.

10. The hinge assembly as claimed in claim 1, wherein each mounting point of the hinge bar has a plurality of mounting bolts configured to couple an associated hinged closure to the hinge bar.

11. A door having a door leaf, a door frame, and a hinge assembly as claimed in claim 1.

12. The door as claimed in claim 11, wherein the hinge bar is arranged on an outer side or on an inner side of the door leaf.

13. A method for mounting a hinge assembly as claimed in claim 1 on the door leaf, wherein firstly the hinge assembly is premounted and then the hinge assembly is mounted on the door leaf.

14. The hinge assembly as claimed in claim 1, wherein the hinge assembly is configured such that operation of the actuating device causes the latch to move in direction perpendicular to movement of the actuating device.

* * * * *